United States Patent
Moffat et al.

(10) Patent No.: US 10,479,703 B2
(45) Date of Patent: Nov. 19, 2019

(54) METHOD FOR REDUCING ARSENIC CONCENTRATION IN AQUEOUS SOLUTIONS

(71) Applicant: Imperial Innovations Limited, South Kensington, London (GB)

(72) Inventors: Christopher Moffat, London (GB); Ramon Vilar Compte, London (GB); Dominik Weiss, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 147 days.

(21) Appl. No.: 15/317,233

(22) PCT Filed: Jun. 12, 2015

(86) PCT No.: PCT/GB2015/051733
§ 371 (c)(1),
(2) Date: Dec. 8, 2016

(87) PCT Pub. No.: WO2015/189634
PCT Pub. Date: Dec. 17, 2015

(65) Prior Publication Data
US 2017/0113949 A1    Apr. 27, 2017

(30) Foreign Application Priority Data
Jun. 13, 2014   (GB) .................................. 1410632.2

(51) Int. Cl.
*C02F 1/28* (2006.01)
*C02F 1/72* (2006.01)
(Continued)

(52) U.S. Cl.
CPC ............. *C02F 1/285* (2013.01); *B01J 20/223* (2013.01); *B01J 20/321* (2013.01);
(Continued)

(58) Field of Classification Search
None
See application file for complete search history.

(56) References Cited

U.S. PATENT DOCUMENTS 5,185,313 A * 2/1993 Porath .................. B01J 20/3208
502/402
6,802,980 B1 10/2004 Khandaker et al.
(Continued)

FOREIGN PATENT DOCUMENTS

CN    103566947 A    2/2014
WO    2008/092724 A1    8/2008
(Continued)

OTHER PUBLICATIONS

Liu et al. (Angewandte Chemie, 2012, 51, 445-449). (Year: 2012).*
(Continued)

*Primary Examiner* — Clare M Perrin
(74) *Attorney, Agent, or Firm* — Renner, Otto, Boisselle & Sklar, LLP

(57) ABSTRACT

Method of reducing the arsenic concentration in an aqueous solution comprising undesired arsenic, which method comprises contacting the aqueous solution with a complex of Formula (I), (Formula (I)) wherein M1 and M2 are the same or different and are independently selected from V, Mn, Ga, Cu, Ni, Co, Fe or Zn; wherein a is 0, or 1, and b is 0, or 1, provided that a+b together must be at least 1; Q is a negatively charged counter ion; n is from 1 to 5; X1 is OH, O, SH or S; L1 is a group selected from —La1-C(O)NR—, —La2-C(O)OR—, —La3-NRC(O)—, La4-OC(O)—, La5-O— or La6-NRO—, wherein La1, La2, La3, La4, La5 and La6 are each C1-6 alkyl, optionally substituted, R is H or C1-6 alkyl optionally substituted; Linker is a polyethylene glycol (PEG) chain with from 1 to 10 repeating units, a
(Continued)

C1-16 polyamine chain or a C1-16 alkyl chain; Z is a solid support; L2 to L7 are independently C1-3 alkyl, optionally substituted; and Het1 to Het4 are independently 5 to 14 membered heteroaryl group having at least one N atom and optionally substituted.

$$\left[ \begin{array}{c} \text{Het}^1 \diagdown \text{L}^5 \diagup (M^1)_a \quad (M^2)_b \diagdown \text{L}^6 \diagup \text{Het}^4 \\ \text{L}^4 - N \qquad\qquad N - L^7 \\ | \qquad X^1 \qquad | \\ L^2 \qquad\qquad L^3 \\ | \\ L^1 \\ | \\ \text{Linker} \diagdown Z \end{array} \right]_n^{[Q]} \quad (I)$$

25 Claims, 15 Drawing Sheets

(51) Int. Cl.
  *B01J 20/22* (2006.01)
  *B01J 20/32* (2006.01)
  *B01J 20/34* (2006.01)
  *C02F 101/10* (2006.01)
  *C02F 103/06* (2006.01)
  *C02F 1/68* (2006.01)

(52) U.S. Cl.
  CPC ....... *B01J 20/3219* (2013.01); *B01J 20/3265* (2013.01); *B01J 20/3425* (2013.01); *C02F 1/281* (2013.01); *C02F 1/288* (2013.01); *C02F 1/72* (2013.01); *C02F 1/683* (2013.01); *C02F 2101/103* (2013.01); *C02F 2101/105* (2013.01); *C02F 2103/06* (2013.01); *C02F 2209/06* (2013.01); *C02F 2303/16* (2013.01)

(56) References Cited

U.S. PATENT DOCUMENTS

| | | | |
|---|---|---|---|
| 2007/0056911 A1 | 3/2007 | Zhao et al. | |
| 2014/0162966 A1* | 6/2014 | Chen | C07J 41/0061 514/26 |
| 2014/0212335 A1* | 7/2014 | Lee | A61L 2/00 422/30 |

FOREIGN PATENT DOCUMENTS

| | | |
|---|---|---|
| WO | 2011/052008 A1 | 5/2011 |
| WO | 2014/120794 A1 | 8/2014 |

OTHER PUBLICATIONS

Lee et al. (Nano Letters, 2014, 14, 1-5; published Jan. 31, 2013. (Year: 2013).*
Leevy et al. (Chem Comm, 2008, 2331-2333). (Year: 2008).*
International Search Report for corresponding International Application No. PCT/GB2015/051733 dated Sep. 29, 2015.
Written Opinion of the International Searching Authority for corresponding International Application No. PCT/GB2015/051733 dated Sep. 29, 2015.
Lee et al., "Synthetic Ligand-Coated Magnetic Nanoparticles for Microfluidic Bacterial Separation from Blood", Nano Letters, vol. 14, No. 1, Jan. 31, 2013, pp. 1-5.
Search Report for corresponding Application No. GB 1410632.2 dated Mar. 12, 2015.
Smedley et al., "A review of the source, behaviour and distribution of arsenic in natural waters", Applied Geochemistry, vol. 17, 2002, pp. 517-568.
Mohan et al., "Arsenic removal from water/wastewater using adsorbents—A critical review", Journal of Hazardous Materials, vol. 142, 2007, pp. 1-53.
Torelli et al., "pH-Controlled Change of the Metal coordination in a Dicopper(II) Complex of the Ligand H-BPMP: Crystal Structures, Magnetic Properties, and Catecholase Activity",. Inorganic Chemistry, vol. 39, No. 16, 2000, pp. 3526-3536.
Adams et al., "Dinuclear nickel(II) and zinc)II) complexes of 2,6-bis[{bis(2-pyridylmethyl)amino}methyl]-4-methylphenol", Inorganica Chimica Acts, vol. 332, 2002, pp. 195-200.
Han et al., "Naked-Eye Detection of Phosphate Ions in Water at Physiological pH: A Remarkably Selective and Easy-to-Assemble Colorimetric Phosphate-Sensing Probe", Angew. Chem., vol. 114, No. 20, 2002, pp. 3963-3965.
Kwon et al., "Phosphorescent Thymidine Triphosphate Sensor Based on a Donor-Acceptor Ensemble System using Intermolecular Energy Transfer", Chemistry, A European Journal, vol. 14, 2008, pp. 9613-9619.
Kanematsu et al., "Arsenic(III, V) adsorption on a goethite-based adsorbent in the presence of major co-existing ions: Modeling competitive adsorption consistent with spectroscopic and molecular evidence", Geochimica et Cosmochimica Acta, vol. 106, 2013, pp. 404-428.
Plaunt et al., "Library Synthesis, Screening, and Discovery of Modified Zinc(II)-Bis(dipicolylamine) Probe for Enhanced Molecular Imaging of Cell Death", Bioconjugate Chemistry, vol. 25, 2014, pp. 724-737.
Oh et al., "Nanoparticle-based Indicator-Displacement Assay for Pyrophosphate", Chemistry, An Asian Journal, vol. 6, 2011, pp. 2034-2039.

* cited by examiner

METHOD FOR REDUCING ARSENIC CONCENTRATION IN AQUEOUS SOLUTIONS

This application is a national phase of International Application No. PCT/GB2015/051733 filed Jun. 12, 2015, and claims priority to Application No. GB 1410632.2 filed Jun. 13, 2014.

The present invention relates to complexes that can be used to reduce the concentration of arsenic in aqueous solutions and a method for the reduction of arsenic from aqueous solutions.

The identification of arsenic as a potent carcinogen in 1993 lead the World Health Organisation (WHO) to revise the guideline for the maximum arsenic content of drinking water from 50 μg $L^{-1}$ to 10 μg $L^{-1}$ (WHO, Guidelines for Drinking Water Quality, 2 edition, 1993). Arsenic in drinking water is threatening the health of people in more than 70 countries around the globe and it is estimated that 170 million people are being unknowingly exposed to unsafe levels of arsenic in their drinking water. The predominant oxidation states of arsenic in water are $As^V$ (as arsenate) and $As^{III}$ (as arsenite). The pH and redox state of the water body determine the species present; in natural waters the hydrogen arsenate anions $H_2AsO_4^-$ and $HAsO_4^{2-}$ dominate (Applied Geochemistry, 2002, 17, 517-568). Arsenic naturally occurs in shallow zones of groundwater in many countries; the worst cases being West Bengal, India and Bangladesh where concentrations of up to 5000 μg $L^{-1}$ have been reported. Additionally, anthropogenic pollution of surface and ground waters from mining and ore processing effluents, insecticides, herbicides and wood preservatives is also problematic (Applied Geochemistry, 2002, 17, 517-568).

Existing methods for the removal of arsenates from water are typically based on precipitation, coagulation/flocculation, membrane filtration, and adsorption, with the latter one being the most widely used (J. Hazard. Mater. 2007, 142, 1-53). However, many adsorbents suffer from fast saturation and/or poor selectivity. Therefore many problematic waters, such as those with high levels of contamination, cannot currently be remediated through adsorption.

U.S. Pat. No. 6,802,980 describes a method for removing dissolved arsenic from an aqueous solution comprising adding lime to the aqueous solution, and adding one or more sources of divalent metal ions other than calcium and magnesium to the aqueous solution.

CN103566947 describes the use of metal oxides, such as manganese dioxide, copper oxide and zinc oxide in arsenic purification technology.

ZA200904449 describes a water purification system comprising zinc(II) oxide.

The listing or discussion of an apparently prior-published document in this specification should not necessarily be taken as an acknowledgement that the document is part of the state of the art or common general knowledge.

It would be advantageous to provide a method of reducing the concentration of arsenic from aqueous solutions, which is efficient and/or has a high affinity for arsenic in its most common oxidation levels and/or can be used for many different problematic waters.

The present invention provides a method of reducing arsenic concentration in an aqueous solution.

The present inventors have surprisingly found that mono and/or di-metallic complexes of ligand of the Formula Ia,

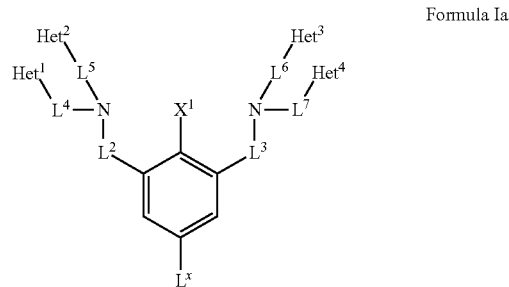

Formula Ia wherein, $L^x$ is a group capable of reacting with/attaching to a solid support, such as $(CH_2)_cR^1$, wherein c is from 1 to 6, and $R^1$ is selected from $NH_2$, OH, Br, Cl, or $C(O)R^2$, wherein $R^2$ is selected from OH, Cl, Br, I, or F;

$X^1$ is OH or SH;

$L^2$ to $L^7$ are independently $C_{1-3}$ alkyl, optionally substituted;

$Het^1$ to $Het^4$ are independently 5 to 14 membered heteroaryl group having at least one N atom and optionally substituted, are highly efficient and selective arsenic binding complexes.

The present invention provides a method for reducing the concentration of arsenic in an aqueous solution comprising undesired arsenic, the method comprising contacting the aqueous solution with a complex of Formula I

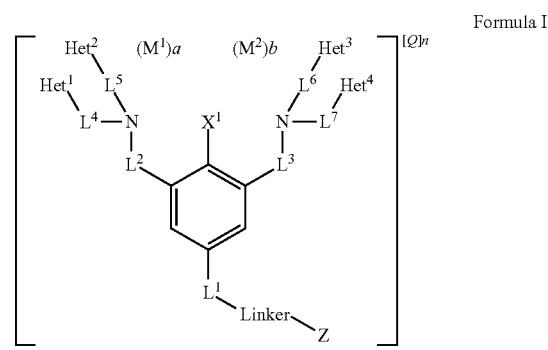

Formula I wherein $M^1$ and $M^2$ are the same or different and are independently selected from V, Mn, Ga, Cu, Ni, Co, Fe or Zn; wherein a is 0, or 1, and b is 0, or 1, provided that a+b together must be at least 1;

Q is any suitable negatively charged counter ion;

n is from 1 to 5;

$X^1$ is OH, O, SH or S;

$L^1$ is a group selected from $-L^{a1}-C(O)NR-$, $-L^{a2}-C(O)OR-$, $-L^{a3}-NRC(O)-$, $-L^{a4}-OC(O)-$, $L^{a5}-O-$ or $L^{a6}-NRO-$, wherein $L^{a1}$, $L^{a2}$, $L^{a3}$, $L^{a4}$, $L^{a5}$ or $L^{a6}$ are $C_{1-6}$ alkyl, optionally substituted, R is H or $C_{1-6}$ alkyl optionally substituted;

Linker is a polyethylene glycol (PEG) chain with from 1 to 10 repeating units, a $C_{1-16}$ polyamine chain or a $C_{1-16}$ alkyl chain;

Z is a solid support;

$L^2$ to $L^7$ are independently $C_{1-3}$ alkyl, optionally substituted;

$Het^1$ to $Het^4$ are independently 5 to 14 membered heteroaryl group having at least one N atom and optionally substituted.

The complex of Formula I may contain one or two metal atoms and if two metals are present they may be the same or different.

Q is preferably a singly charged negative counter ion. For example a counter ion selected from $NO_3^-$, $ClO_4^-$, $AcO^-$, $PF_6^-$, $BF_4^-$, $Cl^-$, $BPh_4^-$ or $Br^-$.

The counter ions in the complex of Formula I are preferably $NO_3^-$, $AcO^-$ or $BF_4^-$.

It would be appreciated that the number of counter ions required for each complex of Formula I will depend on the oxidation state of the metal use and the number of metals present in the complex.

$L^2$, $L^3$, $L^4$, $L^5$, $L^6$, $L^7$ and $L^8$ are preferably all the same. For example, each of $L^2$ to $L^8$ may be —$CH_2$—.

$Het^1$ to $Het^4$ are preferably all the same. For example each of $Het^1$ to $Het^4$ may be pyridine, optionally substituted with —$NHC(O)NH(CH_2)_2R$.

$L^1$ is preferably -$L^{a3}$-NRC(O)—.

$L^{a1}$, $L^{a2}$, $L^{a3}$, $L^{a4}$, $L^{a5}$ or $L^{a6}$ are preferably $C_{1-4}$ alkyl optionally substituted.

The Linker is preferably a polyethylene glycol (PEG) chain with from 1 to 10 repeating units, such as 1, 2, 3, 4, 5 or 6 repeating units, for example 5 repeating units.

Typically the Linker can be part of the solid support.

It is to be understood that preferred complexes for use in the method of the present invention contain one or more of the preferred features discussed above and any combination of these features is envisaged.

One complex of Formula I that is particularly suitable for use in the present invention is one in which $M^1$ or $M^2$ are Zn or $M^1$ and $M^2$ are both Zn; a+b=1 or 2; Q is $NO_3^-$; n is 3, $X^1$ is O, $L^1$ is -$L^{a3}$-NHC(O)—, the linker is a polyethylene glycol (PEG) chain with 5 repeating units, Z is a solid support, $L^2$ to $L^7$ are $C_1$ alkyl and $Het^1$ to $Het^4$ are pyridine or pyridine optionally substituted by —$NHC(O)NH(CH_2)_2$ R.

Unless otherwise specified, $L^1$ is attached to the phenol group of the complex of Formula I through the La portion of $L^1$.

Unless otherwise specified $Het^1$ to $Het^4$ are connected to the complex of Formula I via the carbon atom ortho or para to any N atom.

The complex of Formula I may be a mono or bi-metallic complex as shown below or a mixture thereof. For example, some of the complexes of Formula I may contain a single metal, whereas other complexes of Formula I may contain two metals.

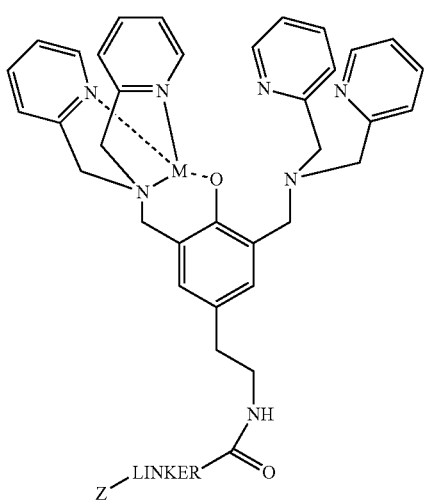

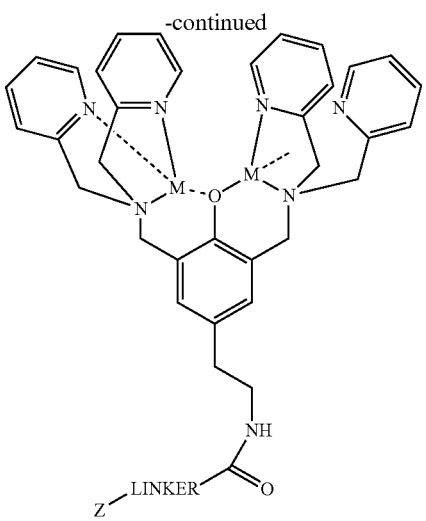

The complex of Formula I may be a mono or bi-metallic complex as shown below or a mixture thereof. For example, some of the complexes of Formula I may contain a single Zn, whereas other complexes of Formula I may contain two Zn.

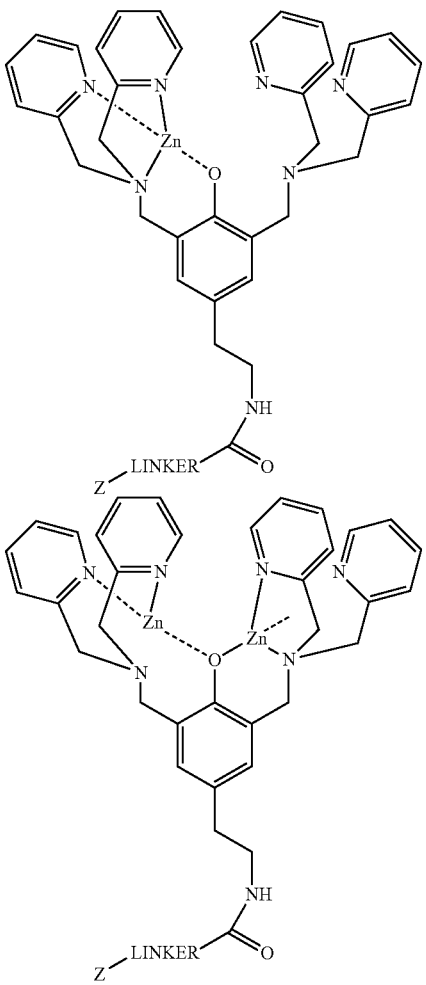

Unless otherwise specified, alkyl groups as defined herein may be straight-chain or, when there is a sufficient number (i.e. a minimum of three) of carbon atoms be branched-chain. Unless otherwise specified, alkyl groups may also be optionally substituted with, for example, one or more substituents selected from halogen, such as fluorine, chlorine, bromine or iodine, cyano, nitro, sulfonyl, hydroxyl, $C_1$-$C_{10}$ alkyl, for example, $C_1$-$C_6$ alkyl, aryl, for example, phenyl, arylalkyl, such as aryl $C_1$-$C_{10}$ alkyl, such as aryl $C_1$-$C_6$ alkyl, for example, benzyl, amide, amino, $C_1$-$C_{10}$ alkylamino, for example, $C_1$-$C_6$ alkyamino, carboxyl, or ester, such as carboxylic ester. Examples of alkyl groups include $C_1$-$C_6$ alkyl, for example methyl, ethyl, n-propyl, iso-propyl, n-butyl, iso-butyl, tert-butyl, pentyl (and isomers thereof), and hexyl (and isomers thereof).

Unless otherwise specified, the term "heteroaryl" when used herein refers to an aromatic group containing one or more heteroatom(s) (e.g. one to four heteroatoms) preferably selected from N, O and S. Heteroaryl groups include those which have between 5 and 14 members (e.g. between 5 and 10) and may be monocyclic, bicyclic or tricyclic, provided that at least one of the rings is aromatic (so forming, for example, a mono-, bi-, or tricyclic heteroaromatic group). When the heteroaryl group is polycyclic the point of attachment may be via any atom including an atom of a non-aromatic ring. However, when heteroaryl groups are polycyclic (e.g. bicyclic or tricyclic), they are preferably linked to the rest of the molecule via an aromatic ring. Heteroaryl groups that may be mentioned include 3,4-dihydro-1H-isoquinolinyl, 1,3-dihydroisoindolyl, 1,3-dihydroisoindolyl (e.g. 3,4-dihydro-1H-isoquinolin-2-yl, 1,3-dihydroisoindol-2-yl, 1,3-dihydroisoindol-2-yl; i.e. heteroaryl groups that are linked via a non-aromatic ring), or, preferably, acridinyl, benzimidazolyl, benzodioxepinyl, benzothiadiazolyl (including 2,1,3-benzothiadiazolyl), benzothiazolyl, benzoxadiazolyl (including 2,1,3-benzoxadiazolyl), benzoxazinyl (including 3,4-dihydro-2H-1,4-benzoxazinyl), benzoxazolyl, benzomorpholinyl, benzoselenadiazolyl (including 2,1,3-benzoselenadiazolyl), carbazolyl, chromanyl, cinnolinyl, imidazolyl, imidazo[1,2-a]pyridyl, indazolyl, indolinyl, indolyl, isochromanyl, isoindolinyl, isoindolyl, isoquinolinyl, isothiazolyl, isothiochromanyl, isoxazolyl, naphthyridinyl (including 1,6-naphthyridinyl or, particularly, 1,5-nophthyridinyl and 1,8-nophthyridinyl), oxadiazolyl (including 1,2,3-oxadiazolyl, 1,2,4-oxadiazolyl and 1,3,4-oxadiazolyl), oxazolyl, phenazinyl, phenothiazinyl, phthalazinyl, pteridinyl, purinyl, pyranyl, pyrazinyl, pyrazolyl, pyridazinyl, pyridyl, pyrimidinyl, pyrrolyl, quinazolinyl, quinolinyl, quinolizinyl, quinoxalinyl, tetrahydroisoquinolinyl (including 1,2,3,4-tetrahydroisoquinolinyl and 5,6,7,8-tetrahydroisoquinolinyl), tetrahydroquinolinyl (including 1,2,3,4-tetrahydroquinolinyl and 5,6,7,8-tetrahydroquinolinyl), tetrazolyl, thiadiazolyl (including 1,2,3-thiadiazolyl, 1,2,4-thiadiazolyl and 1,3,4-thiadiazolyl), thiazolyl, triazolyl (including 1,2,3-triazolyl, 1,2,4-triazolyl and 1,3,4-triazolyl) and the like. Substituents on heteroaryl groups may, where appropriate, be located on any atom in the ring system including a heteroatom. Substituents can include urea based substituents, such as —NHC(O)NH(CH$_2$)$_2$R. For example, the heteroaryl groups may be pyridyl substituted by —NHC(O)NH(CH$_2$)$_2$R. Heteroaryl groups may also be in the N- or S-oxidised form. Heteroaryl groups mentioned herein may be stated to be specifically monocyclic or bicyclic.

It may be specifically stated that the heteroaryl group is monocyclic or bicyclic. In the case where it is specified that the heteroaryl is bicyclic, then it may consist of a five-, six- or seven-membered monocyclic ring (e.g. a monocyclic heteroaryl ring) fused with another a five-, six- or seven-membered ring (e.g. a monocyclic aryl or heteroaryl ring).

Heteroatoms that may be mentioned include phosphorus, silicon, boron and, particularly, oxygen, nitrogen and sulfur.

The present invention also provides the use of a complex of Formula I as previously defined to reduce the concentration of arsenic in an aqueous solution comprising undesired arsenic. Typically, in this use the complex of Formula I is contacted with an aqueous solution comprising undesired arsenic.

A preferred complex for use in the present invention is a complex of Formula I in which both $M^1$ and $M^2$ are Zn.

Another preferred complex of Formula I for use in the present invention is as shown below.

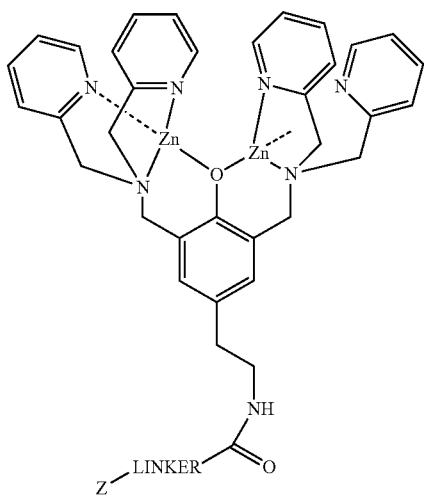

As described previously, the complex of Formula I for use in the present invention may be a mixture of mono and bi-metallic complexes of Formula I.

The present invention also provides a complex of Formula I to which arsenic is bound. Such as complex may be formed by contacting an aqueous solution comprising arsenic with a complex of Formula I.

Arsenic in an aqueous solution predominately exists as arsenate and arsenite. The complex of Formula I reduces the level of arsenic present in an aqueous solution by reducing the amount of arsenate present. Therefore, as used in the present invention, the term "reducing the concentration of arsenic" should be taken to mean reducing the concentration of arsenic in the form of arsenate.

If it is desired to remove arsenic that is present in solution in another form, the other form of arsenic can be converted to arsenate before contacting the aqueous solution with a complex of Formula I.

By the term aqueous solution we mean a water based solution; that is a solution in which the major component is water. As used herein, the term aqueous solution encompasses water that may also comprise suspended and/or dissolved compounds or compositions. It is to be understood that the aqueous solution may comprise other dissolved compounds in the form of salts in addition to the undesirable arsenic/arsenic salts. It will be appreciated that even potable water can be considered to be an aqueous solution, as potable water typically contains dissolved compounds, such as salts.

The method of the present invention can be used to reduce the concentration of arsenic in an aqueous solution and to provide potable water. By the term potable we mean water safe enough to be consumed by humans or used with low risk to human health in the immediate or long term.

It will be appreciated that the aqueous solution to be treated may comprise contaminants and other undesirable compounds in additional to arsenic. Thus, it may be necessary to use the method of the invention in combination with other treatment methods in order to provide potable water.

Preferably the method of the invention reduces the level of arsenic to below 10 µg $L^{-1}$. For example, below 5 µg $L^{-1}$, most preferably below 1 µg $L^{-1}$.

It is envisaged that any suitable aqueous solution can be used in the method of the present invention. In order to be suitable for use in the present invention, the aqueous solution will comprise arsenic. Typically, the arsenic in an aqueous solution treated in accordance with the method of the present invention will be present as arsenate or arsenite. The level of arsenic species present (arsenate or arsenite) in the aqueous solution will depend on the pH and redox state of the water. For example, in natural water hydrogen arsenate anions typically predominate. As used herein, the term arsenic encompasses salts of arsenic such as arsenate and arsenite, unless otherwise stated.

Typically the aqueous solution used in the present invention is any aqueous solution that comprises arsenic in the form of arsenate. If the aqueous solution comprises arsenic in the form of arsenite it may be necessary to include a pre-oxidation step to oxidise the arsenite present into arsenate. Methods suitable for oxidising arsenite to arsenate would be known to those skilled in the art and may include, but are not limited to, reacting the aqueous solution with chlorine.

Examples of aqueous solution that can be used in the present invention include, but are not limited to, ground water and water obtained from wells.

For the avoidance of doubt, in this specification when we use the term comprising or comprises we mean that the composition or formulation or component being described must contain the listed ingredient(s) but may optionally contain additional ingredients. When we use the term consisting essentially of or consists essentially of we mean that the composition or formulation or component being described must contain the listed ingredient(s) and may also contain small (for example up to 5% by weight, or 1% by weight or 0.1% by weight) other ingredients, provided that any additional ingredients do not affect the essential properties of the composition, formulation or component. When we use the term consisting of or consists of we mean that the composition, formulation or component being described must contain the listed ingredient(s) only.

The method of the invention may for example remove at least about 50% by weight, more preferably about 90% by weight, and even more preferably at least about 95%, for example about 99% by weight of the arsenic in the aqueous solution.

Before treatment, the level of arsenic can vary within wide limits and is typically dependant on the source of the water. For example, ground water from West Bengal may comprise up to about 5000 µg $L^{-1}$ of arsenic.

The aqueous solution to be treated in accordance with the method of the present invention may have any pH. For example, the pH of the aqueous solution may be from about 1 to about 10, such as from about 3 to about 10. For example, the pH of the aqueous solution may be from about 5 to about 10, or from about 5 to about 8, such as about 7.

In some instances it may be necessary to increase the pH of the aqueous solution. For example, to increase the pH of the aqueous solution from a pH of from about 1 to about 3, to a pH of from about 4 to about 8, such as a pH of about 7. Such techniques would be well known to the person skilled in the art.

The present invention can be used to provide an aqueous solution containing less than about 10 µg $L^{-1}$ of arsenic, for example, less than about 5 µg $L^{-1}$, most preferably less than about 1 µg $L^1$. It would be understood by those skilled in the art that the reduction of arsenic in the aqueous solution may depend on the starting concentration of arsenic. For example, the present invention can provide a reduction from about 1000 µg $L^{-1}$ of arsenic to about 6 µg $L^{-1}$ of arsenic.

The complex of Formula I is provided on or in a solid support Z. Any suitable solid support can be used. The solid support used may depend on many factors, such as the nature of the aqueous solution to be treated. Materials that can be used as solid supports in the present invention include, but are not limited to, gel-type polystyrene resins, macroporous polystyrene resins, alumina and metal oxides (e.g. silica). Gel type resins are understood to mean those resins where the pores in the resin are not of a fixed size and will vary depending on operating conditions, such as the solvent used.

In one aspect of the invention the solid support does not comprise silica, for example, the solid support is not silica nanoparticles. More particularly, in one aspect, when $M^1$ and/or $M^2$ is zinc, the solid support does not comprise zinc, for example, the solid support does not comprise silica nanoparticles.

In a further aspect the complex used in the present invention does not comprise silica nanoparticles functionalised with a ZnII-dipicolyamine derivative.

It would be appreciated that such solid supports for use in the present invention can be joined to any suitable Linker.

Typically, solid supports suitable for use in the present invention are insoluble in water. An example of a suitable solid support is a polystyrene based resin, such as a polystyrene co-polymer containing a polyethylene glycol linker. Examples of resins suitable for use in the method of the present invention are HypoGel™ resins, which can be obtained from Rapp-Polymere. HypoGel™ amine acylated with succinic acid is a preferred solid support for use in the present invention.

A solid support that can be used in the present invention is a gel-type polystyrene resin cross-linked with 1% DVB (divinylbenzene) (HypoGel™).

The gel-type polystyrene resin cross-linked with 1% DVB (divinylbenzene) (HypoGel™) can have any suitable particle size, however, a preferred particle size is from 100 to 150 µm.

The gel-type polystyrene resin cross-linked with 1% DVB (HypoGel™) can be joined to any suitable linker. A preferred linker is a polyethylene glycol linker, typically with from 1 to 10 repeating units. In a preferred aspect, the number of repeating units is 5.

A particularly preferred solid support used in the present invention is a gel-type polystyrene resin cross-linked with 1% DVB (divinylbenzene) (HypoGel™) with a particle size of from 100 to 150 µm and a Linker which is a PEG chain with 5 repeating units.

It is important that the complex of Formula I remains in predominantly solid form when contacted with the aqueous solution comprising arsenic. For example, it is preferred that is the complex of Formula I has a solubility in water at 20° C. of not more than 0.1 mg/ml, for example less than 0.1 mg/L.

As a result of the presence of the solid support, the complex of Formula I are typically not water soluble. As a result, the complex of Formula I remains predominately in solid form when contacted with an aqueous solution.

The complex of Formula I can be prepared by taking a ligand of formula Ia as previously defined,

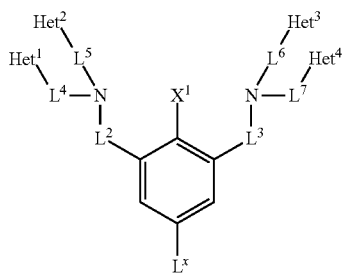

Formula Ia and then loading the ligand of Formula Ia with the required metal or metals to form an intermediate compound of Formula II, wherein $M^1$, $M^2$, a, b, Q and n are as previously defined for the complex of Formula I. Such techniques would be well known to the person skilled in the art.

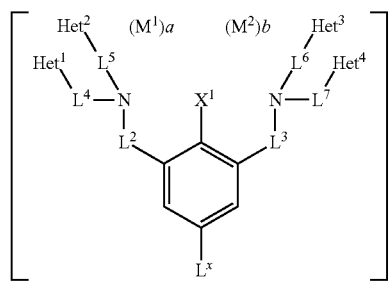

Formula II

The intermediate compound of Formula II can be joined to the required solid support by reacting the $R^1$ group (as previously defined for the group $L^x$ in the compound of Formula Ia) of $L^x$ with a group A on the Linker (as previously defined for the complex of Formula I) to form a complex of Formula I. Wherein A is any group capable of reacting with $R^1$, for example, $C(O)R^2$, Br or Cl. Such techniques would be well known to the person skilled in the art.

Alternatively, the ligand of Formula Ia may be joined to the solid support to form an intermediate of Formula III, wherein $L^1$. Linker and Z are as previously defined for the complex of Formula I, before being loaded with the required metal or metals to form a complex of Formula I.

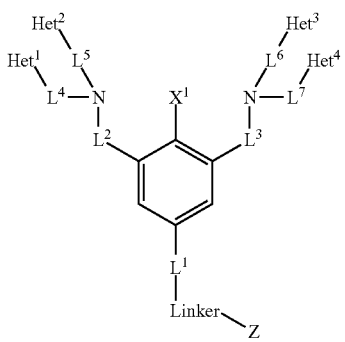

Formula III

The ligand of Formula Ia can be joined to the solid support by reacting the $R^1$ group of $L^x$ with a group A (as previously defined) on the Linker attached to the solid support capable of reacting with the $R^1$ group of the ligand of Formula Ia. The intermediate compound of Formula III is then loaded with the required metal or metals. Such techniques would be well known to the person skilled in the art.

In a preferred aspect, the group A on the Linker attached to the solid support capable of reacting with the $R^1$ group of the intermediate of Formula II or the ligand of Formula Ia is selected from $NH_2$, OH, Br, Cl, or $C(O)R^2$, wherein $R^2$ is selected from OH, Cl, Br, Cl, I or F.

An example of a route for the preparation of the complex of Formula I is shown below:

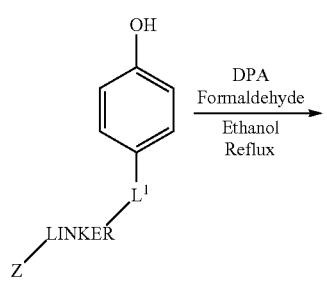

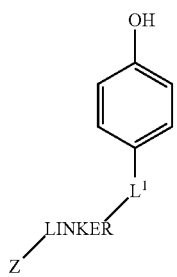

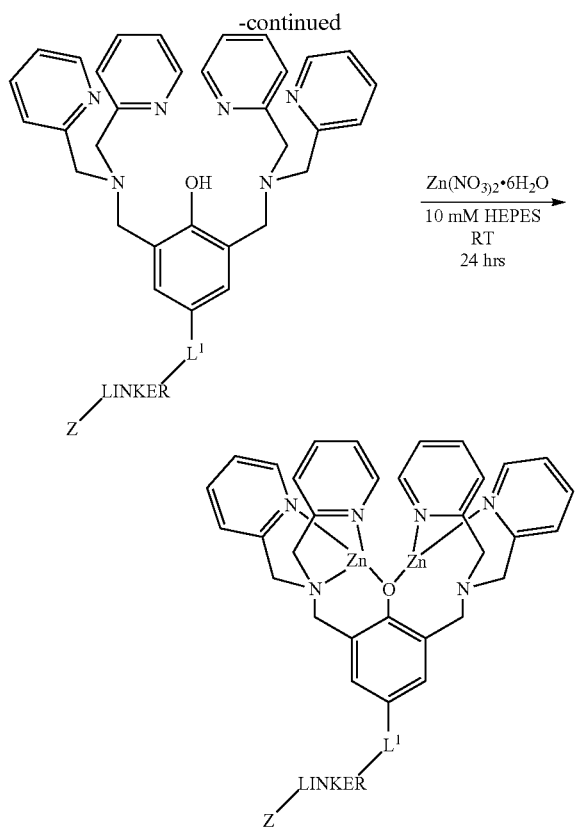

wherein Z, Linker, A, $L^x$ and $L^1$ are as previously refined.

Loading the ligand of Formula Ia or the intermediates of Formula III with metal typically comprises reacting the ligand or intermediate with the required metal in the form of a metal salt. For example $Zn(NO_3)_2 \cdot 6H_2O$.

It is to be understood that in some cases the metal loading may not be 100% (100% metal loading refers to the situation when each complex molecule comprises two metal atoms). For example, not all of the co-ordination sites in the ligand or intermediate may contain a metal. In these situations, the complex of Formula I may be a mixture of mono- and bi-metallic complexes, and may also comprise complexes containing no metal at all.

The complex of Formula I typically has a metal loading of at least about 40%, for example at least about 50%, such as from about 50% to about 100% or about 60% to about 90%, e.g. about 100% or about 90%.

In the method for reducing the arsenic concentration according to the present invention, typically, the ratio of the complex of Formula I to aqueous solution is from about 0.001:1 to about 1:1 in weight %.

The contact time between the aqueous solution and the complex of Formula I will depend on the manner in which the contacting is taking place. For example, if the aqueous solution and the complex of Formula I are contacted in a batch experiment then the contact time may be typically be from about 1 to about 24 hours, e.g. about 12 to about 24 hours. If the complex of Formula I is contained within a column such that the aqueous solution runs through the column, then the contact time is typically less, for example from about 1 second to about 1 hour, such as from about 1 second to about 30 minutes or from about 1 second to about 10 minutes. It would be appreciated by the skilled person that the time that the complex of Formula I is in contact with the aqueous solution will depend on factors such as the initial concentration of arsenic in the aqueous solution.

Typically, the aqueous solution will only be contacted with the complex of Formula I once. However, it is envisaged that there may be situations where it is necessary to recycle the aqueous solution in order to increase the time that the solution is in contact with the complex of Formula I more than once, such as two, three or four times. Suitable means of recycling would be known to the person skilled in the art.

The present invention also provides a filtration device comprising a complex of Formula I. The filtration device of the present invention can, for example, be a column or a flat bed.

The present invention also provides cartridges containing a complex of Formula I to be used in a filtration device, such as a column or a flat bed.

Systems in which the methods and/or complexes of the present invention can be employed include but are not limited to large surface water or wastewater treatment plants, plants for treating pumped groundwater, in-situ in subsurface groundwater, water filters, water softeners, and water remediation systems.

For example, it is envisaged that water may be passed through a treatment tank comprising the complex of Formula I. The size of the treatment tank would depend on the scale of the water treatment. The water treatment tank may be present on its own or be part of a multi-treatment system.

The complex of Formula I may be provided in a filtration device such as a filter jug.

Typically, the complex of Formula I is used at atmospheric pressure. However, it is envisaged that there may be situations where increased or decreased pressure may be required. In such instances the contact time between the complex of Formula I and the aqueous solution may be decreased or increased as necessary.

The method of the present invention may be conducted as a batch process or as a continuous process.

The method of the present invention may additionally comprise a step in which the arsenic containing aqueous solution is filtered prior to the aqueous solution being contacted with the complex of Formula I and/or a step in which the aqueous solution is filtered after the aqueous solution has been contacted with the complex of Formula I.

The method of the invention may additionally comprise a step in which the arsenic containing aqueous solution is oxidised prior to the aqueous solution being contacted with the complex of Formula I. Oxidation of the aqueous solution converts arsenic present as arsenite to arsenate. If the method comprises a filtration step, the oxidation step may be conducted before or after the arsenic containing aqueous solution is filtered.

Oxidation of any arsenite present in the aqueous solution comprising undesired arsenic may be conducted by reacting the aqueous solution comprising undesired arsenic with an oxidising agent. Oxidising techniques suitable for the oxidation of arsenite to arsenate would be known to the person skilled in the art, and may include, for example, the use of chlorine based oxidising agents or photocatalytic oxidation.

The method of the present invention may use an additional absorbent. The selection of the additional absorbent may depend on the nature of the aqueous solution. It is envisaged that any known absorbent may be used in combination with the complex of Formula I. The additional absorbent may be for removing arsenic or may be for removing other contaminants present in the aqueous solution. For example, other contaminants that need to be removed to make water potable. The additional absorbent may be an iron oxide absorbent. An example of such an absorbent is Bayoxide™.

If the complex of Formula I is present in a column, cartridge or flat bed, then the additional absorbent may be present in the same column, cartridge or flat bed or maybe contained in a further column, cartridge or flat bed.

The methods and complexes of the invention may be used in combination with other known arsenic removal processes, including coagulation and microfiltration.

It has been found by the present inventors, that it is possible to remove arsenic that has been absorbed by the complexes of the invention so that the complexes are reusable.

The complex of Formula I can be regenerated by desorbing any arsenic from the complex. For example, the complex of Formula I can be regenerated by contacting the complex of Formula I to which arsenic is bound with a solution of an alkali earth metal salt or an alkali metal salt with a pH of about 7 to about 10. For example, a solution of a halide salt of an alkali metal. Examples of preferred solutions for regenerating the complex of Formula I are NaCl or NaOAc solutions.

The method of the invention may comprise a regeneration step. This step is conducted after the aqueous solution comprising undesired arsenic has been contacted with a complex of Formula I and the resulting aqueous solution has been separated from the complex.

The regeneration of the complex of Formula I may result in the generation of aqueous arsenic containing waste solution. In an aspect of the invention, the aqueous arsenic containing waste solution may itself be recycled.

In one aspect, the present invention provides a method that comprises the following steps:

(i) contacting the aqueous solution comprising undesired arsenic with a complex of Formula I to form a complex of Formula I to which arsenic is bound; and (ii) contacting the complex of Formula I to which arsenic is bound formed in step (i) with a NaCl or NaOAc solution with a pH of from about 7 to about 10.

The method of the present invention can optionally include filtering the aqueous solution before step (i), between steps (i) and (ii) and/or filtering the solution between steps (ii) and (iii), and may optionally include an oxidation step before or after filtering before step (i).

The present invention also provides a method of providing potable water. The method of providing potable water comprises contacting the water with a complex of Formula I as previously defined and may additionally comprise other steps to remove undesirable compounds and substances in the aqueous solution. Methods of removing other undesirable compounds and substances are known in the art.

The present invention provides a complex of Formula IV,

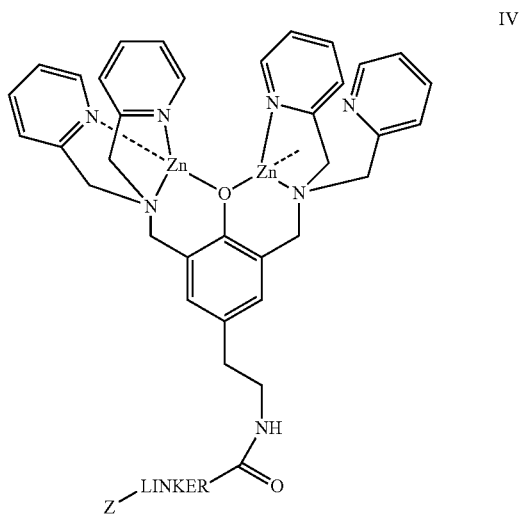

IV wherein Z and Linker are as previously defined for the complex of Formula I. An example of a suitable solid support is a polystyrene based resin, such as a polystyrene co-polymer, wherein the Linker is a polyethylene glycol linker. An example of such a resin is HypoGel™ resin.

In one aspect of the invention, the solid support of the complex of Formula IV does not comprise silica, for example, the solid support is not silica nanoparticles.

Preferences and options for a given aspect, feature or parameter of the invention should, unless the context indicates otherwise, be regarded as having been disclosed in combination with any and all the preferences and options for all other aspects, features and parameters of the invention.

The present invention also provides a complex of Formula I to which arsenic is bound.

BRIEF DESCRIPTION OF THE FIGURES

Reference

Reference

The present invention is now illustrated, but not limited, by the following Examples.

Metal complexes $L^1$-$Cu_2$, $L^1$-$Ni_2$, $L^1$-$Zn_2$ (as defined below) were prepared by slight modifications of previously reported procedures by Torelli et al., Inorg Chem., 2000, 39, 3526 to 3536, Adams et al., Inorganica Chimica Acta, 332, 2002, 195 to 200 and Han et al., Angew Chem., 2002, 114, 3963 to 3965.

REFERENCE EXAMPLE 1

Comparative Screening Affinity of metallo-receptors $L^1$-M2 by Indicator Displacement Assays (IDAs).

The binding of arsenate, phosphate and sulphate by complexes 1-3 was investigated by indicator displacement assays (IDAs) using the following procedure.

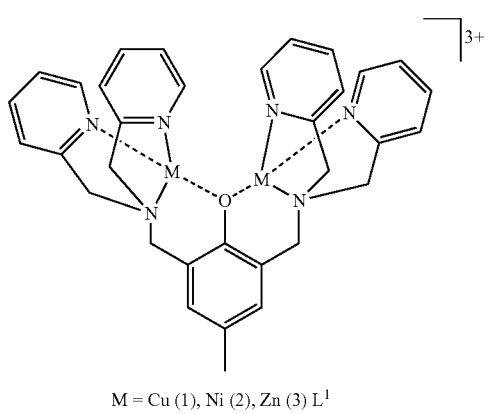

M = Cu (1), Ni (2), Zn (3) $L^1$

A 5 mM stock solution of each complex was prepared in acetonitrile and stored at −18° C. A solution of 100 mM 4-(2-hydroxyethyl)-1-piperazineethanesulfonic acid (HEPES) in Milli-Q water was adjusted to pH=7.5 with 2 M NaOH and used as buffer. A 5 mM stock solution of pyrocatechol violet (PV) indicator was prepared freshly as required using this buffer solution. A 250 μM working solution of each complex and indicator was prepared via a twenty-fold dilution in buffer. 500 μM working solutions of $Na_2HAsO_4 \cdot 7H_2O$, $Na_2HPO_4$ and $(NH_4)HSO_4$ were also prepared in 100 mM HEPES at pH 7.5 by dilution of 50 mM stocks.

25 μL of PV working solution and 25 μL of complex working solution were added to a series of wells on a 96 well plate. 1 and 10 equivalents of $[HAsO_4]^{2-}$, $[HPO_4]^{2-}$ and $[SO_4]^{2-}$ anions were then added to the corresponding wells, and every solution was made to a final volume of 250 μL with HEPES buffer. The absorbance of each solution was then recorded at λ=445 nm.

Figure 1:
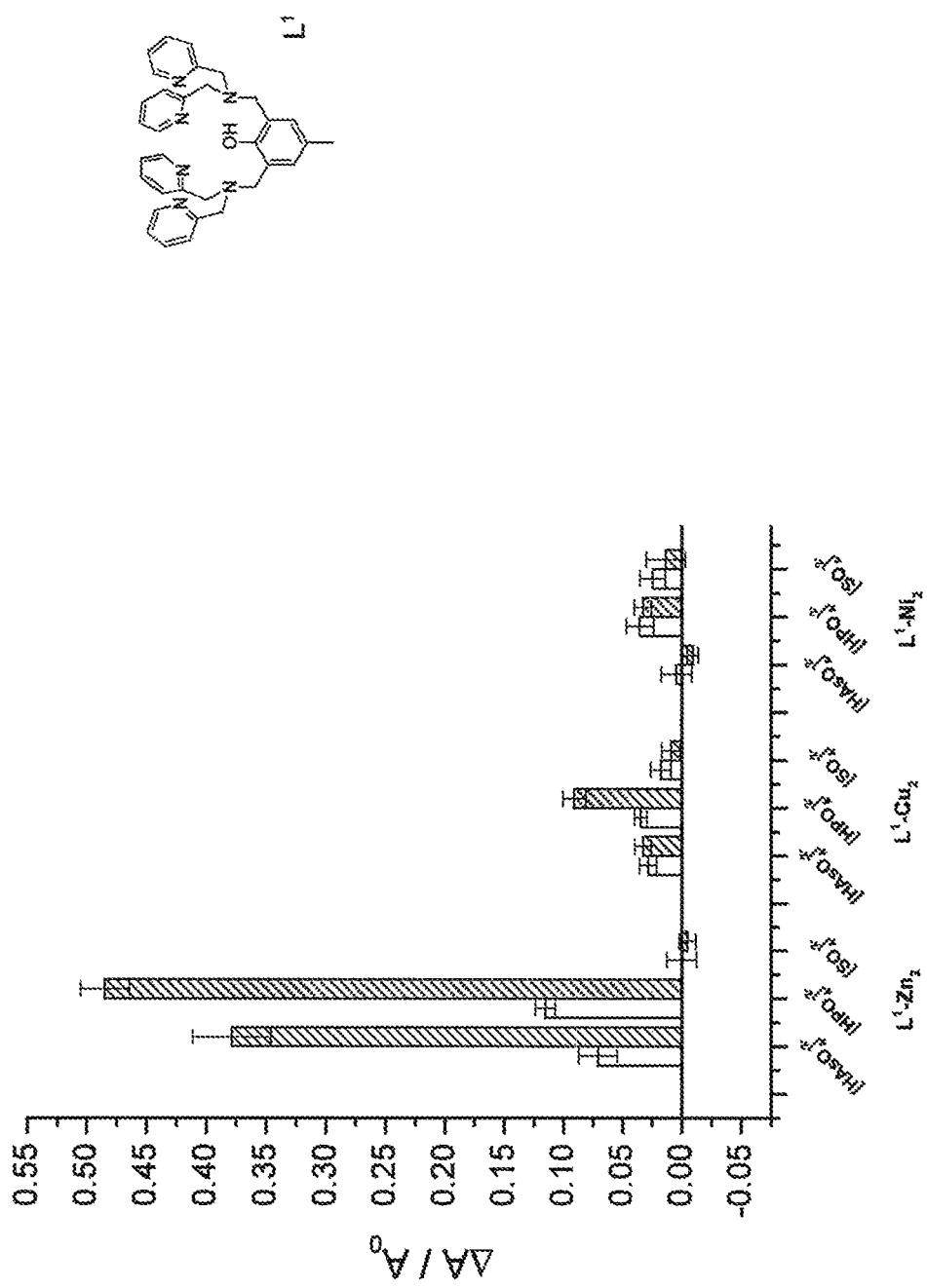
FIG. 1 shows a plot of the relative changes in UV/Vis absorbance at 444 nm upon addition of 1 equivalent (clear) and 10 equivalents (shaded) of $[HAsO_4]^{2-}$, $[HPO_4]^{2-}$ and $[SO_4]^{2-}$ anions to a solution containing 50 µM of either $L^1$-$Zn_2$, $L^1$-$Cu_2$, $L^1$-$Ni_2$, and 50 µM PV in 100 mM HEPES at pH 7.

As shown in FIG. 1, the Zn complex ($L^1$-$Zn_2$) did not show any binding to sulphate under the experimental conditions.

REFERENCE EXAMPLE 2

Interaction of $L^1$-$Zn_2$ with oxoanions by isothermal titration calorimetry.

Isothermal titration calorimetry (ITC) was used to study the interaction of receptor $L^1$-$Zn_2$ with arsenate, phosphate and sulphate using the following procedure.

A 0.2 mM solution of each complex was prepared in 100 mM HEPES buffer at pH 7.5, and stored at −18° C. 3 mM anion solutions of $Na_2HAsO_4 \cdot 7H_2O$, $Na_2H_2PO_4$ and $(NH_4)HSO_4$ were also prepared in 100 mM HEPES at pH 7.5 by dilution of 50 mM stocks. All solutions were filtered through a 0.45 μm syringe filter and degassed before use.

A solution of the $L^1$-$Zn_2$ complex was stirred at constant temperature in the calorimetric cell. A solution of anion was then accurately titrated into the cell, and the heat change upon each addition was measured. This titration data was then integrated using MicroCal Origin software to produce a binding isotherm, from which K, ΔH and the stoichiometric parameter n could all be determined.

Figure 2:
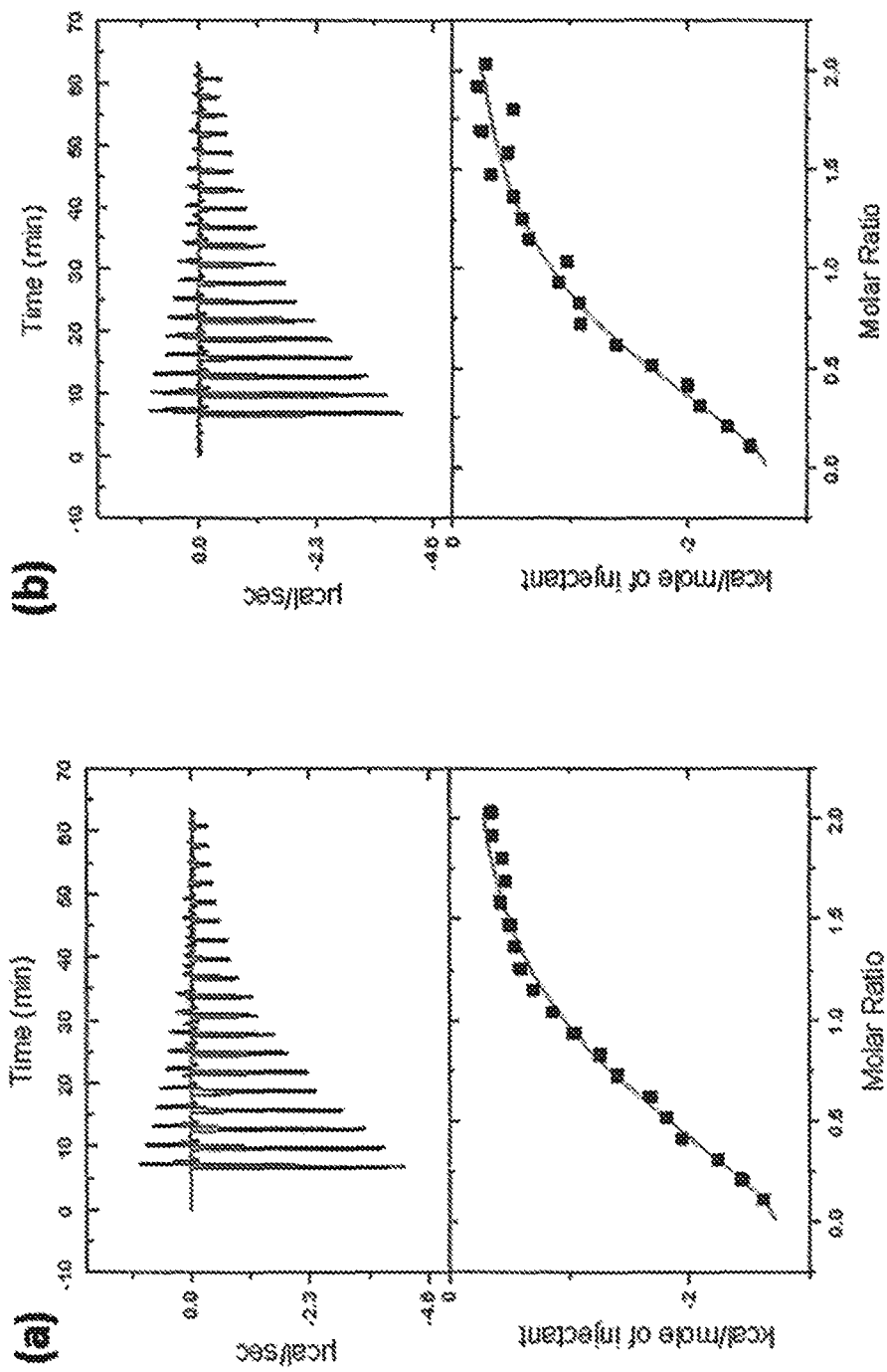
FIG. 2 shows the raw Isothermal titration calorimetry (ITC) data (top) and integrated binding curve (bottom) obtained upon making: (a) 20×10 µL injections of 3 mM $Na_2HPO_4$ into a cell containing 0.2108 mM of $L^1$-$Zn_2$; (b) 20×10 µL injections of 3 mM $Na_2HAsO_4$·$7H_2O$ into a cell containing 0.2108 mM of $L^1$-$Zn_2$.

Raw ITC data and the integrated binding curves for the titration of complex $L^1$-$Zn_2$ with arsenate and phosphate are shown in FIG. 2. From these data, it was possible to determine the binding constants between $L^1$-$Zn_2$ and these anions (see Table 1).

These results are consistent with those obtained during the indicator displacement assays (vide supra), showing that $L^1$-$Zn_2$ binds with good affinity to aqueous arsenate (at pH 7.5, hence present as $HAsO_4^{2-}$) but not to sulphate.

The ITC data was also used to determine ΔH for the binding process for both anions, which was determined to be negative, showing that these are enthalpy-driven interactions. This conclusion was also reached by Han et al (Angew. Chem., 2002, 114, 3963-3965) during their studies of this zinc complex.

TABLE 1

| Anion | K ($M^{-1}$) – ITC | K ($M^{-1}$) – IDA | ΔH (kJ $mol^{-1}$) – ITC |
|---|---|---|---|
| $HAsO_4^{2-}$ | $(1.45 \pm 0.32) \times 10^4$ | $(1.63 \pm 0.35) \times 10^4$ | −4.02 ± 0.50 |
| $HPO_4^{2-}$ | $(2.08 \pm 0.51) \times 10^4$ | $(2.10 \pm 0.40) \times 10^4$ | −3.68 ± 0.21 |
| $SO_4^{2-}$ | No binding detected | No binding detected | n/a |

EXAMPLE 3

Preparation of Solid Supported Di-Zinc Complex (Zn-HypoGel)

An ethyl amine derivative of L¹ was prepared (see scheme 1) by following the procedure adapted by Kwon et al (Chem. A Eur. J., 2008, 14, 9613-9619).

Scheme 1- Synthesis of the amine appended ligand to be immobilised on the resin. Procedure adapted from Kwon et al.

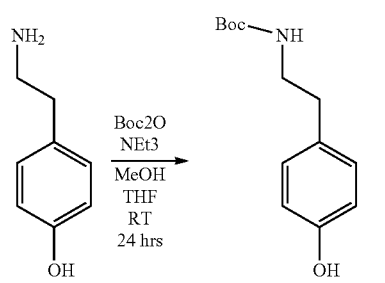

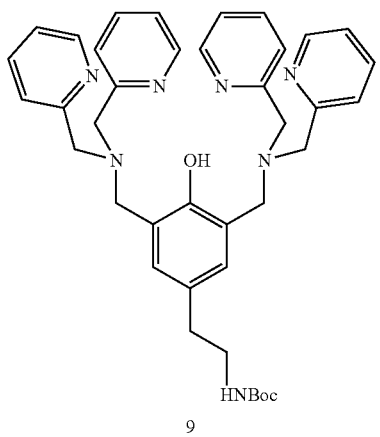

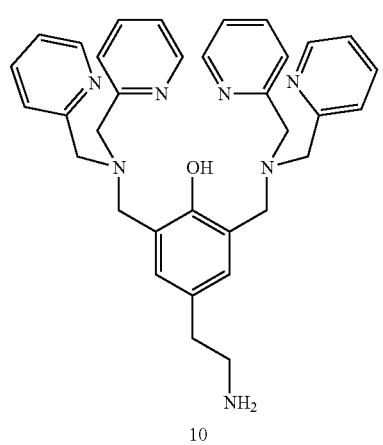

Scheme 2- Synthesis of the functionalised resin using standard amide coupling methods

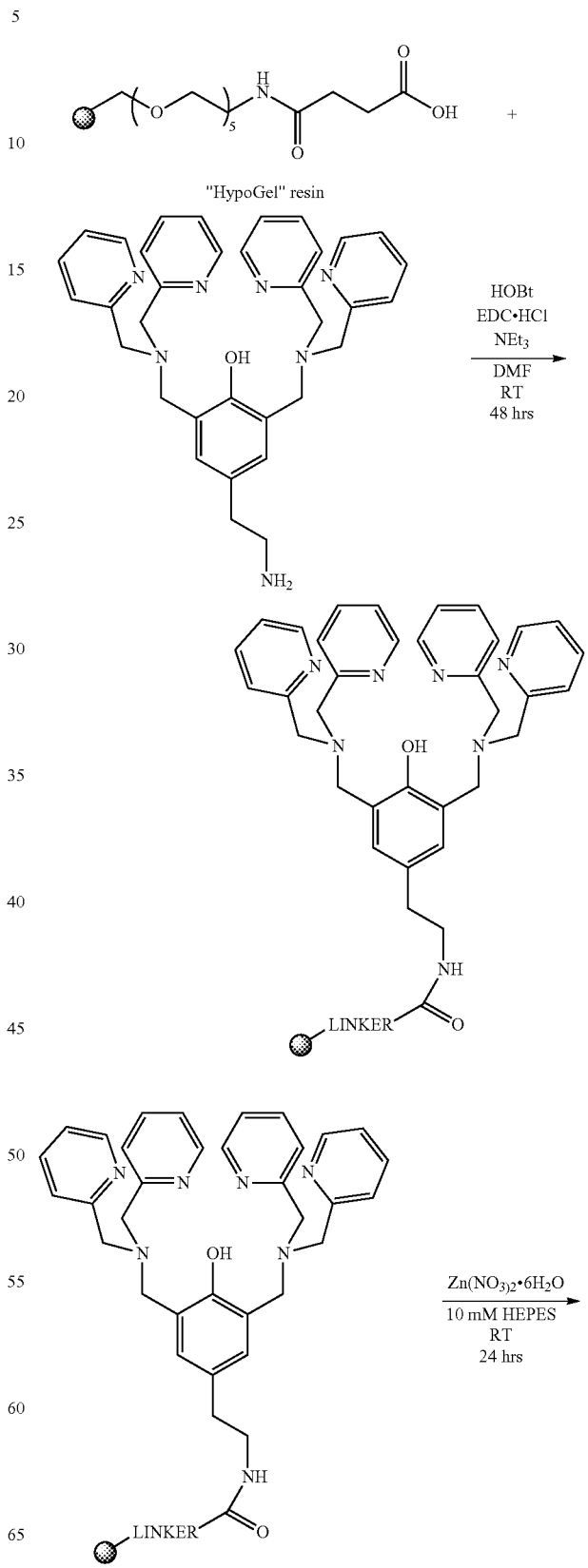

The resulting amine-functionalised L1 (compound 10) was then reacted with HypoGel™ resin containing 0.9 mmol g-1 loading of succinic acid.

-continued

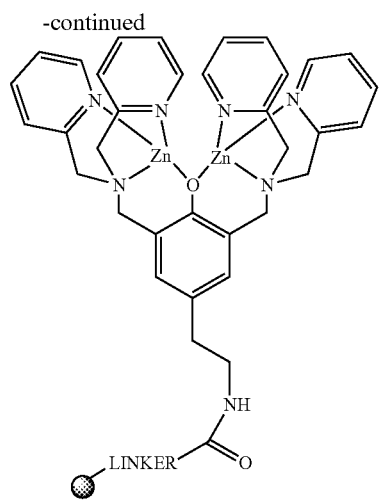

This reaction was carried out using standard amide coupling reagents in DMF, as shown in Scheme 2. Ligand concentration in the reaction solution was monitored by HPLC analysis. Following the reaction, the resin was washed with DMF, $CH_2Cl_2$, methanol and finally diethyl ether, and then dried under reduced pressure until the weight remained constant. From the increase in dry weight of the resin, the extent of $L^1$ functionalisation was determined to be 0.29 mmol g-1. The functionalised HypoGel™ beads were than loaded with zinc(II) by shaking a suspension of beads in a solution of $Zn(NO_3)_2.6H_2O$ (10 mM HEPES at pH 7). The zinc(II) concentration in the initial and final solutions was quantified using a colorimetric dye. This showed a loading of zinc(II) on the beads of 0.30 mmol g-1, i.e. 52% of the ligand sites were filled with zinc.

EXAMPLE 4

Loading to HypoGel™ Resin and Quantification of Loading Achieved

Zn-loading to HypoGel resin: HypoGel™ resin and compound 10 (as defined in Example 3) were shaken in 10 mM HEPES buffer at pH 7 (5 ml) for 30 minutes to allow the resin to swell (loading: 0.254 mmol/g, 0.233 g, 0.059 mmol of compound 10).

The buffer was then removed by filtration and the resin shaken in a HEPES buffered solution containing $Zn(NO_3)_2.6H_2O$ (0.073 g, 0.244 mmol) at room temperature for 24 hours. After this time the solution was removed by filtration, and the resin washed 3 times with 3 ml of buffer (30 minutes for each wash).

The zinc concentration in the starting and final solutions, as well as in the 3 buffer washes, was quantified using UV/vis spectroscopy in conjunction with a colorimetric zinc indicator (PV). Aliqouts were taken from the zinc loading solutions and mixed with 100 µM PV. The absorbance at 605 nm was recorded and the zinc concentration in the solutions could be determined.

These concentration values were used to determine the amount of zinc that had been taken up by the resin after 24 hours by comparing the values obtained with the calibration line produced using the zinc quantification procedure described below.

Figure 9:
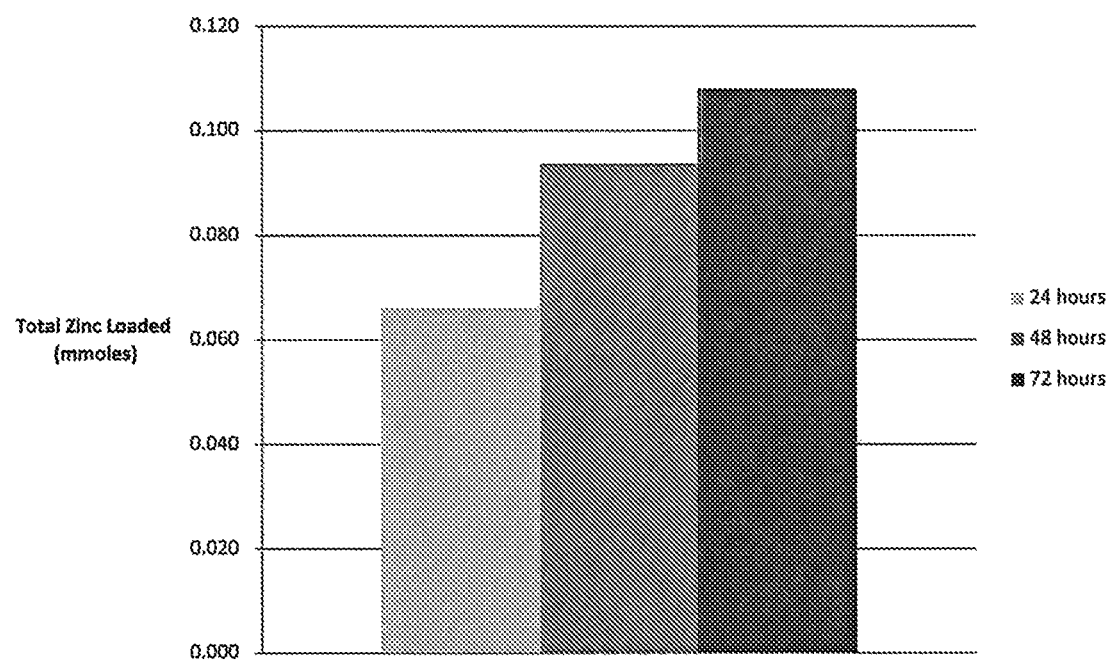
FIG. 9 shows how the zinc loading was increased by extending the incubation time.

The loading procedure described above was then repeated a further two times and the loading after each subsequent 24 hour incubation was calculated with the results shown in FIG. 9.

Total Zn content after 72 hours=0.46 mmol/g (91% sites filled).

Figure 8:
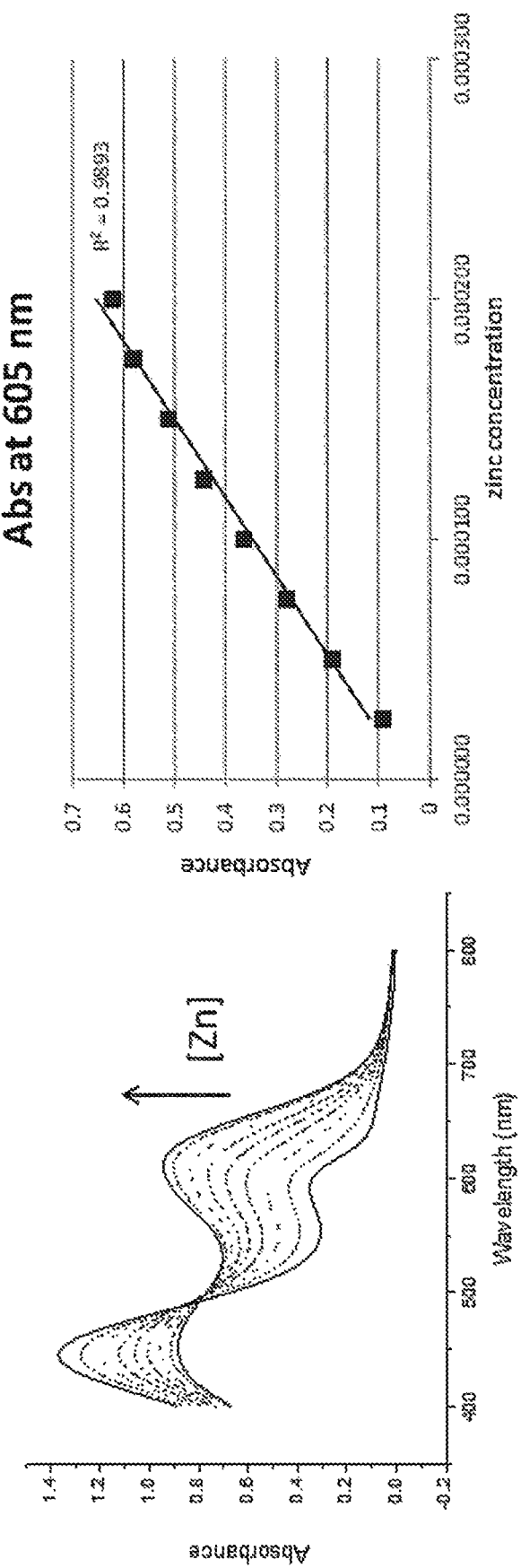
FIG. 8 shows (a) the raw UV/vis data obtained upon addition of a zinc standard to a solution of 100 μM PV at pH 7 and (b) the calibration line obtained upon plotting the absorbance at 605 nm vs zinc concentration with a Coefficient of Determination ($R^2$) of 0.9893.

Zinc quantification: A 13.5 mM working solution of $Zn(NO_3)_2.6H_2O$ was prepared in 10 mM HEPES at pH 7. Aliquots of this zinc standard were then added to a cuvette containing 100 µM Pyrocatechol Violet (PV—a dye commonly used for colorimetric detection of metal ions), and the absorbance spectrum recorded after each addition. This data was used to produce a calibration line of absorbance at 605 nm vs zinc concentration with a Coefficient of Determination ($R^2$) of 0.9893 (see FIG. 8).

EXAMPLE 5

Batch Equilibrium Arsenate Adsorption Studies

The arsenate adsorption properties of the resin were studied by carrying out batch equilibrium adsorption experiments using the following procedure.

A solution of 10 mM HEPES was prepared in Milli-Q water and adjusted to pH 7 with 1 M NaOH. A 1000 ppm arsenic stock was prepared by dissolving $Na_2HAsO_4.7H_2O$ in buffer, and a 100 ppm solution was prepared by subsequent dilution of the stock. 5 ml of buffer was added to each of 7 Luer lock syringes, fitted with a frit and cap. Varying volumes of the arsenic stock and working solutions were then added to the syringes, to give an arsenic concentration range from 1 ppm to 25 ppm. 5 mg of adsorbent was then added to each syringe, and the solution placed on an orbital shaker at 100 rpm for 24 hours. After this time, the shaking was stopped and each solution was removed and acidified with 0.1 M HCl. The arsenic concentration was then determined by Differential Pulse Anodic Stripping Voltammetry.

Origin was used to fit the isotherm data using the Langmuir equation shown below, where qe is the amount of arsenic adsorbed at equilibrium (mg g-1), Ce is concentration of arsenic in solution at equilibrium (mg L-1), Qmax is the theoretical arsenic adsorption capacity and b is the affinity coefficient.

$$qe = \frac{bQ\mathrm{max}Ce}{1+bCe}$$

Figure 3:
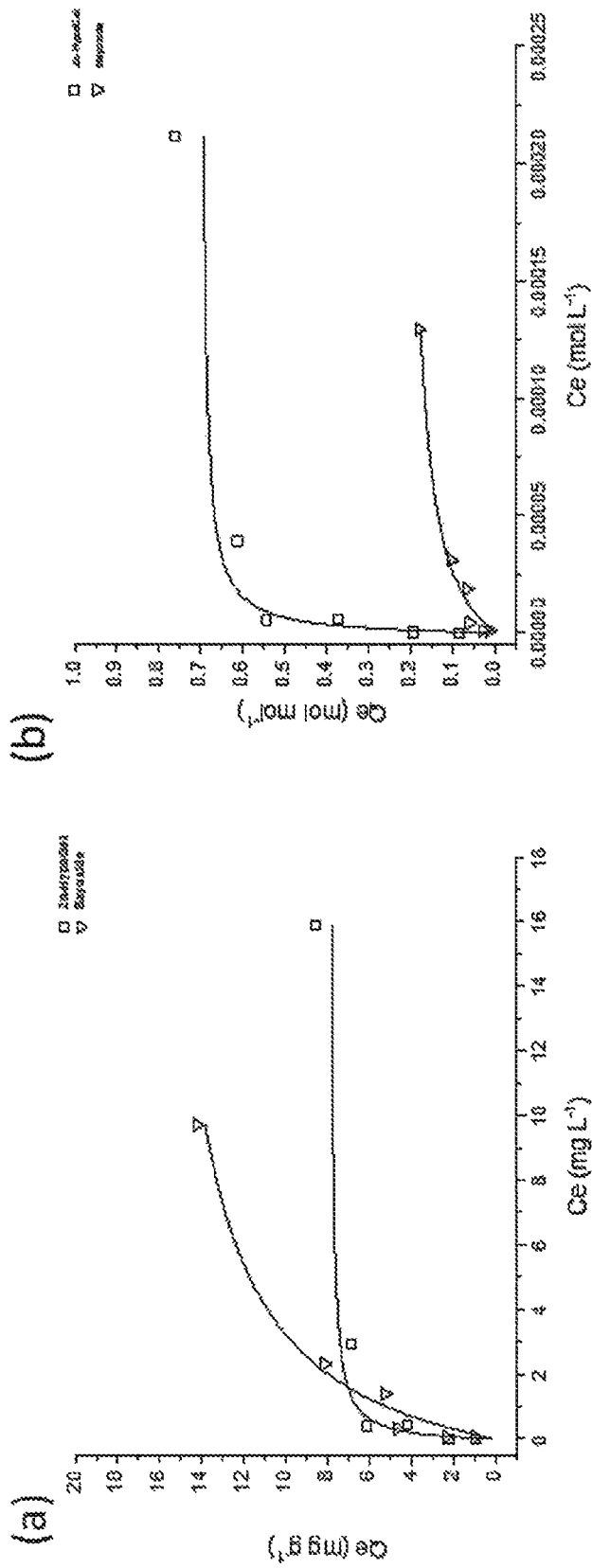
FIG. 3 shows (a) arsenate adsorption isotherms with Langmuir model for the Zn-HypoGel complex (Ia) and Bayoxide™ carried out using a 10 mM HEPES solutions (pH 7); (b) arsenate adsorption isotherms for Zn-HypoGel and Bayoxide™ shown in terms of the number of moles adsorbed per mole of active sites available.

FIG. 3 shows the Langmuir fitted arsenate adsorption isotherms for both the Zn-HypoGel resin and a commercial iron oxide (Bayoxide™). From this data, the theoretical arsenic absorption capacity (Qmax) for the Zn-HypoGel was determined to be 6.9±1.1 mg g-1 and the Langmuir affinity coefficient (b) was 12.2±7.9 (L/mg).

The arsenate adsorption isotherm for the commercial iron oxide (Bayoxide™) is also shown in FIG. 3 and the Qmax was determined to be 17 mg g-1. The two isotherms are compared more closely in FIG. 3 where the arsenic uptake is normalised to the number of moles of sorbent sites. Determination of the number of Bayoxide™ active sites present was based on calculations previously carried out by Kanematsu et al (Geochim. Cosmochim. Acta., 2013, 106, 404-428), and the number of Zn-HypoGel sites was calculated from the results of the zinc loading experiments. FIG. 3 clearly illustrates the greater arsenate affinity of Zn-HypoGel sites as compared with Bayoxide™, i.e. 1 mole of Zn-Hypogel sites would adsorb 0.7 moles of arsenate, while 1 mole of Bayoxide™ sites would adsorb 0.2 moles of arsenate.

The difference in affinity is also demonstrated when comparing the arsenate adsorption in the isotherm solutions at the lower end of the concentration range studied. For example, Zn-HypoGel reduced an initial concentration of 1000 μg L-1 to 6 μg L-1 after 24 hours, whereas for Bayoxide the final concentration was 60 μg L-1 (99% adsorption compared to 94%). This clearly shows the superior arsenate adsorbing properties of Zn-HypoGel.

EXAMPLE 6 pH Effect on Arsenate Adsorption

The arsenate uptake over a range of pH values was investigated by batch studies using the following procedure.

Solutions over a pH range of 3-10 were prepared by buffering Milli-Q water with 10 mM sodium formate (pH 3), sodium acetate (pH 4 and 5), HEPES (pH 7 and 8) and sodium tetraborate (pH 9 and 10). A 1,000 ppm arsenic stock was prepared by dissolving $Na_2HAsO_4.7H_2O$ in Milli-Q water. 50 ml of each buffer was added to separate reaction bottles, followed by 15 μL of As stock to give an initial arsenic concentration of 300 ppb. 5 mg of Zn-HypoGel or Bayoxide™ was then added to the reaction solutions, and the bottles were placed on an orbital shaker at 100 rpm for 24 hours. After this time, the shaking was stopped and a sample removed and acidified with 0.1 M HCl, ready for analysis by DPASV.

Figure 4:
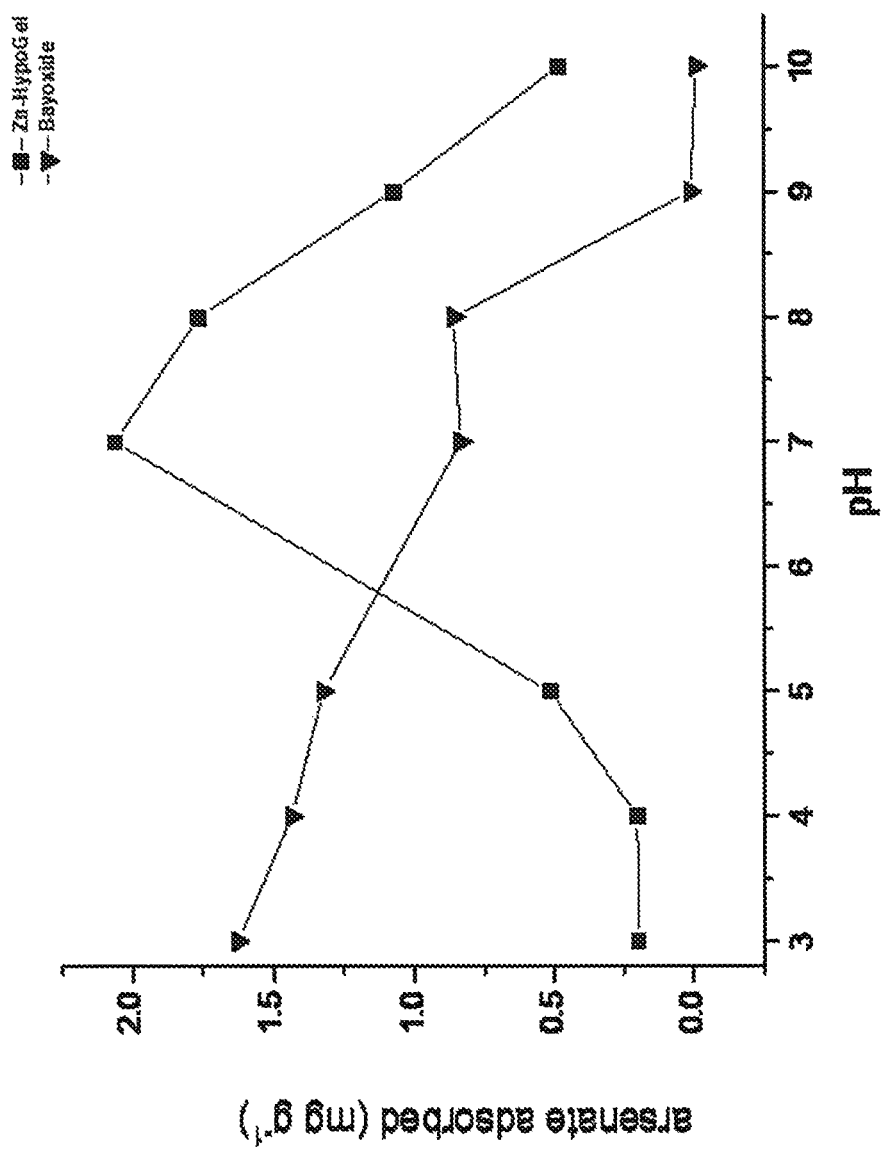
FIG. 4 shows the arsenic adsorbed onto Bayoxide™ and the Zn-HypoGel complex (Ia) after shaking 5 mg of sorbent with 50 ml of 300 ppb arsenate solution for 24 hours.

The arsenate uptake over pH range 3-10 is shown in FIG. 4.

As can be seen from FIG. 4, Bayoxide™ performs better compared to Zn-HypoGel at low pH, and adsorption is inhibited above pH 8.5 (the point of zero charge). The Zn-HypoGel resin demonstrates a greater affinity for arsenate above pH 5, and the adsorption was greatest at pH 7. This is advantageous as pH adjustment of natural water samples would not be required to reach the optimum performance of the Zn-HypoGel resin.

EXAMPLE 7

Adsorption in the Presence of Competitive Ions

In order to investigate the adsorption performance of the Zn-HypoGel under more realistic conditions, batch experiments were also carried out using solutions whose composition was based on NSF Standard 53, so called 'Challenge Water', which is used as a standard in many laboratories to assess the performance of potential arsenic adsorbents using the following procedure.

A solution consisting of $Na_2SiO_3$, $NaHCO_3$, $MgSO_4$, $NaNO_3$, NaF, $NaH_2PO_4.H_2O$, $CaCl_2$ and $Na_2HAsO_4.7H_2O$ was prepared according to the procedure described for NSF Standard 53. The solution was adjusted to pH 7 with 1 M HCl. 50 ml of this solution was added to a plastic bottle, followed by 5 mg of Zn-HypoGel or Bayoxide™. The bottle was then placed on an orbital shaker at 100 rpm for 24 hours, after which time the shaking was stopped and a sample removed and acidified with 0.1M HCl. The arsenic concentration was then determined by Differential Pulse Anodic Stripping Voltammetry.

The composition of the solutions prior to contacting with Zn-HypoGel or Bayoxide™ is shown in Table 2.

TABLE 2

The concentration of each component of the competitive solutions, as well as their relative proportion to arsenate, which was present at 300 ppb.

| Ion | Concentration (mM) | Equivalents (relative to arsenate) |
|---|---|---|
| $SiO_3^{2-}$ | 0.34 | 82 |
| $HCO_3^-$ | 2.97 | 725 |
| $SO_4^{2-}$ | 0.50 | 122 |
| $NO_3^-$ | 0.14 | 34 |
| $F^-$ | 0.05 | 13 |
| $HPO_4^{2-}$ | 0.001 | 0.33 |
| $Cl^-$ | 1.98 | 482 |
| $Mg^{2+}$ | 0.50 | 122 |
| $Ca^{2+}$ | 0.99 | 241 |

Figure 5:
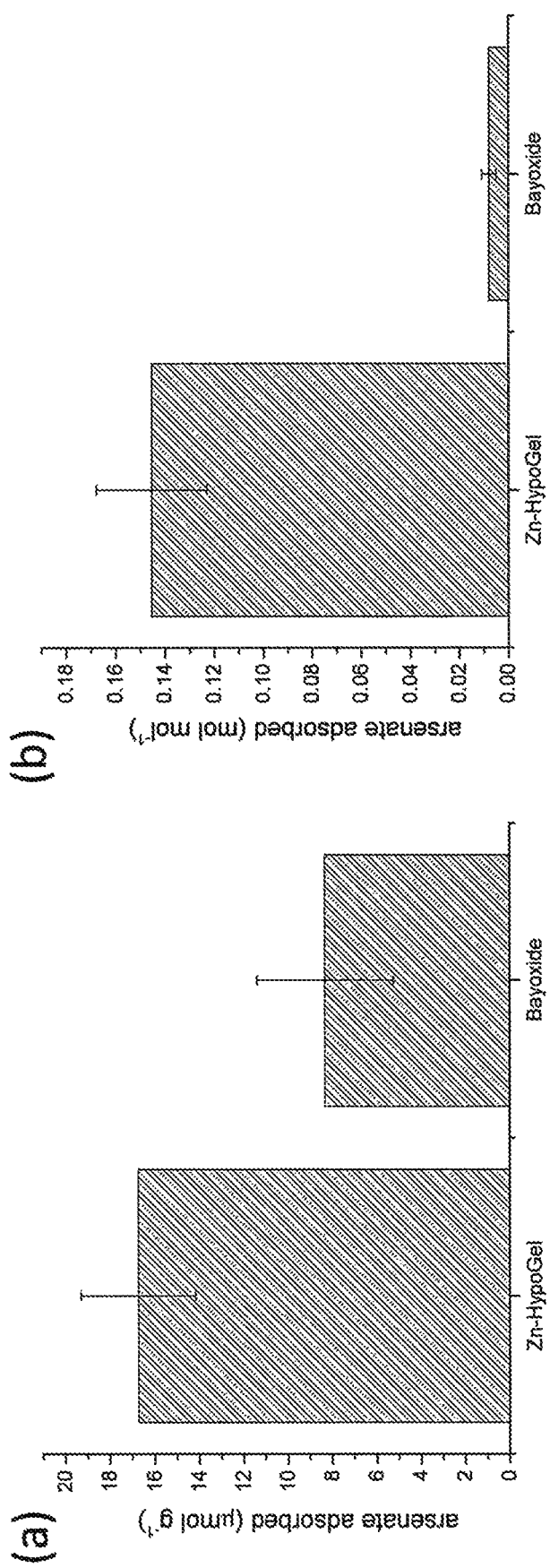
FIG. 5 shows (a) the number of moles of arsenate adsorbed onto 5 mg of Bayoxide™ and 5 mg of the Zn-HypoGel complex (Ia) after 24 hours shaking in 50 ml of Challenge Water at pH 7 and (b) the number of moles of arsenate adsorbed per mole of active sites available.

The resulting arsenate uptake after shaking both Zn-HypoGel and Bayoxide™ for 24 hours in 'Challenge Water' is shown in FIG. 5. It can be seen clearly that 5 mg of the Zn-HypoGel sorbent was able to adsorb twice as much arsenic from this competitive solution than Bayoxide™. This can be attributed to the greater selectivity of Zn-HypoGel adsorption sites towards arsenate over the majority of the species present in the "challenge water".

EXAMPLE 8

Regeneration of HypoGel resin.

In order to demonstrate that the Zn-HypoGel sorbent could be regenerated after use, a series of adsorption/desorption cycles were carried out using the following procedure.

A 5 ml solution of HEPES buffer (pH 7) and 15 μL of 1,000 ppm arsenic stock were added to a luer syringe fitted with a frit and lock, followed by 5 mg of ZnHypoGel sorbent. After 24 hours of shaking at 100 rpm, the solution was removed by filtration and the concentration of arsenic remaining in solution was determined. A solution of 1.37 M NaCl was prepared and adjusted to pH 10 with 1 M NaOH. 5 ml of the brine was added to the As-laden sorbent and the syringe returned to the shaker. The arsenic concentration in the brine was determined after 24 hours—this process was repeated until no further arsenic was desorbed. The resin was then washed with copious Milli-Q water and buffer, before the next arsenic solution was added, and the adsorption/desorption cycle was repeated.

Figure 6:
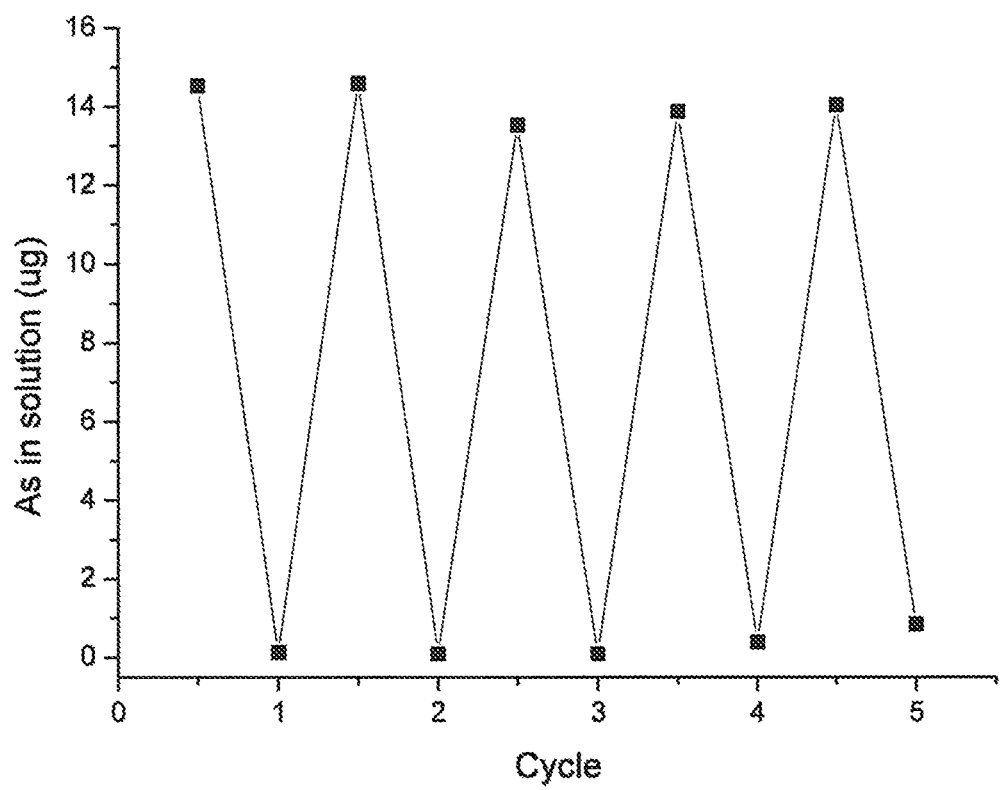
FIG. 6 shows a plot showing adsorption and subsequent desorption (5 cycles) of arsenate from the Zn-HypoGel complex (Ia) resin.

The results of the regeneration studies is shown in FIG. 6.

It can be seen from FIG. 6, that it was possible to desorb all of the arsenic from the Zn-HypoGel without effecting the adsorption of arsenic in further cycles.

EXAMPLE 9

Use of Zn-HypoGel Resin in Fixed-Bed Columns.

Figure 10:
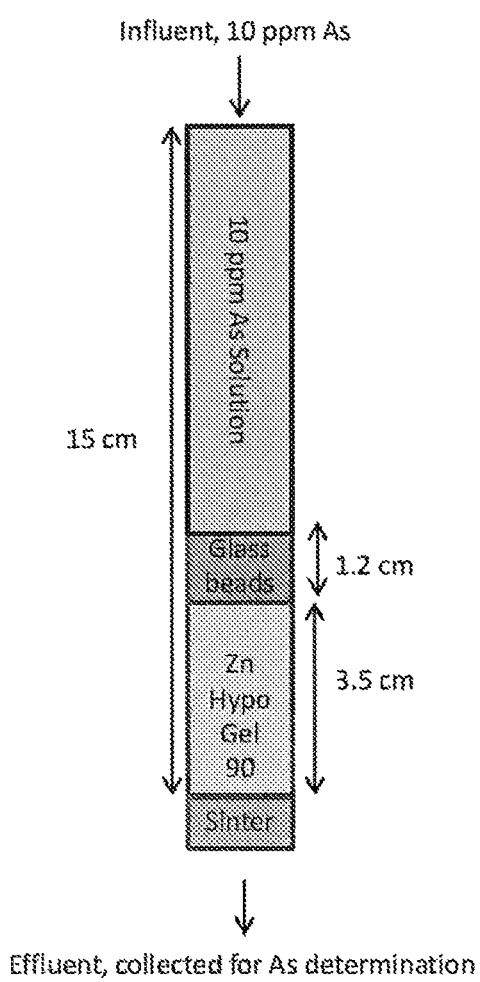
FIG. 10 shows a diagram of a fixed bed column as used in Experiment 9.

In order to determine whether Zn-HypoGel had potential to be used in a flow-through water treatment system, fixed-bed column studies were carried out. Dry Zn-HypoGel was added to a glass column (1.4 g resin, 3.5 cm bed depth, 1 cm column diameter) and packed in Milli-Q water. Glass beads were added on top of the wet resin to act as a solution distributor as shown in FIG. 10. The column was washed with HEPES buffer before adsorption experiments were carried out. The bed volume (BV) was 2.75 $cm^3$.

A solution of 10 ppm arsenate buffered at pH 7 with HEPES was then passed through the column using a Watson-Marlow 101 U peristaltic pump. The flow rate was maintained at 1 ml/min giving an empty bed contact time (EBCT) of 2.8 minutes. Fractions of the column effluent were collected and the total arsenic concentration was determined by DPASV.

Figure 11:
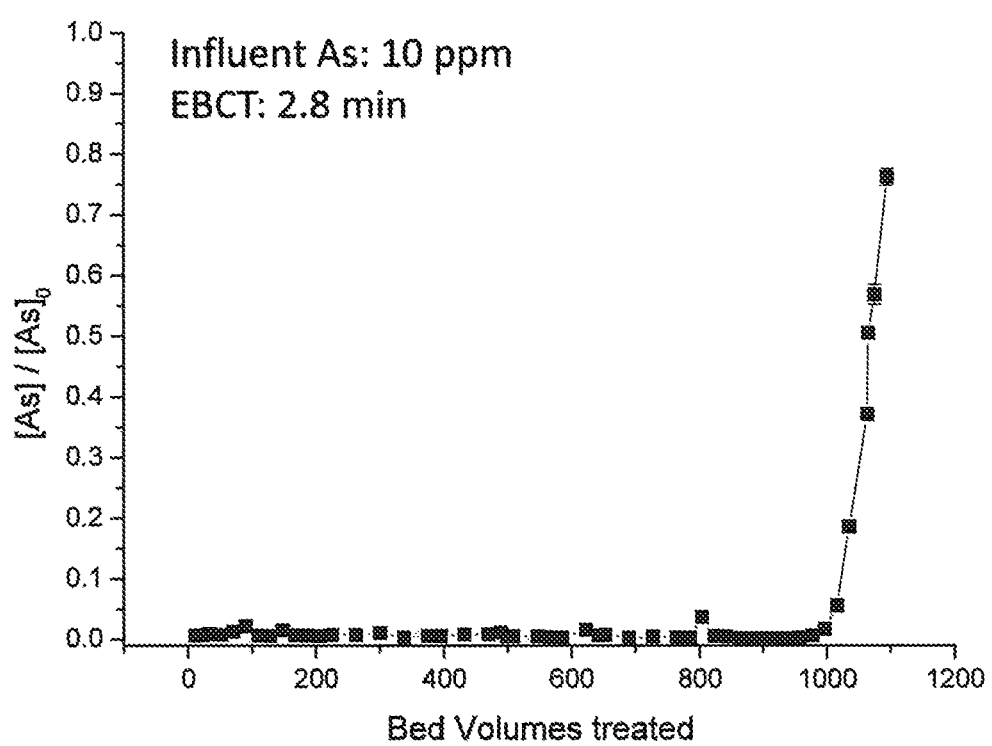
FIG. 11 shows a plot of normalised effluent $As^V$ concentration against bed volumes treated by passing a solution of 10 ppm $As^V$ through a glass column packed with Zn-HypoGel-90.

FIG. 11 shows that adsorption by Zn-HypoGel in the column was very efficient. The effluent concentration was <100 ppb for up to 1000 bed volumes (BV) i.e. >99% adsorption occurred in the column.

Arsenic began to break through (i.e. the column becomes saturated) after 2.75 L (1000 BV) of the 10 ppm $As^V$ solution had been treated. Given that the average adsorption measured over this time was 99% this translates to total adsorption of c.a. 0.35 mmoles $As^V$ by the column. This correlates very closely with the expected number of available binding sites—from the zinc loading calculations it was determined that Zn-HypoGel contained 0.23 mmoles sites/g therefore a 1.4 g column contains 0.32 mmoles of adsorption sites.

EXAMPLE 10

Regeneration of Zn-HypoGel in a Fixed Bed Column

Figure 12:
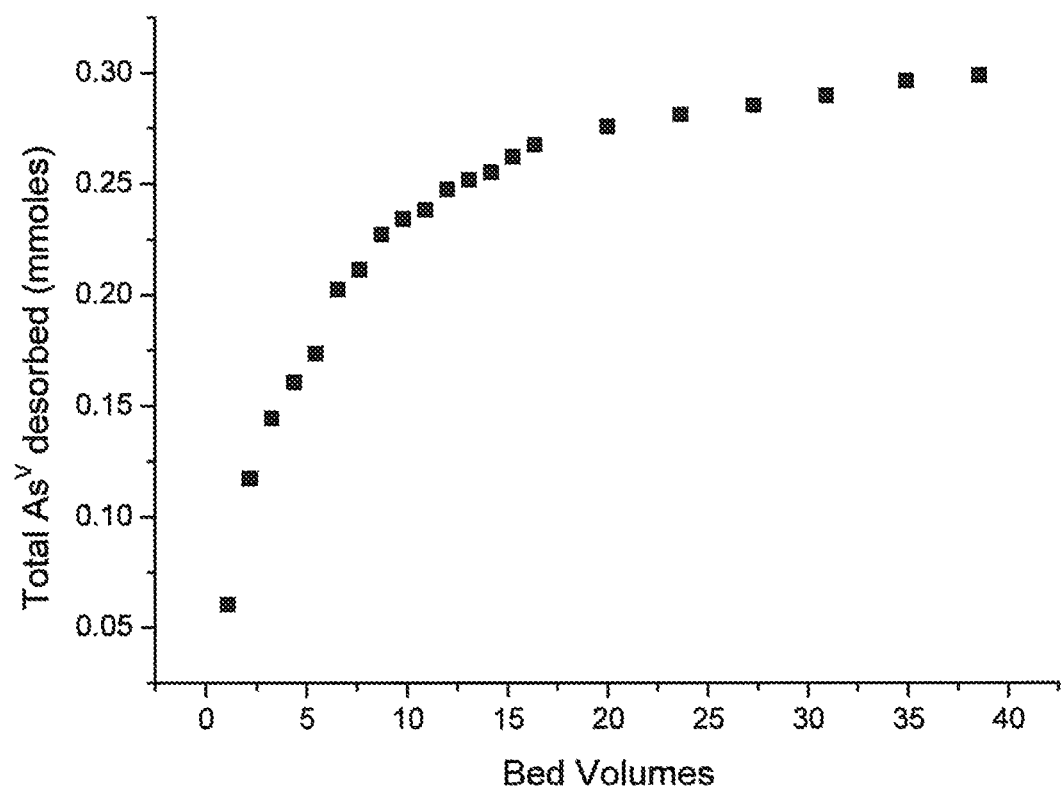
FIG. 12 shows a plot of the total mmoles $As^V$ desorbed from Zn-HypoGel-90 column against the number of bed volumes of NaOAc wash solution.

The regeneration of Zn-HypoGel with 1 M NaOAc at pH 10 was shown to be efficient during batch experiments. Therefore this solution was used to regenerate the fixed bed column after $As^V$ saturation. As shown in FIG. 12, near total removal of adsorbed $As^V$ was achieved after flushing with 40 BV of acetate solution. After $As^V$ desorption the column was again washed with HEPES and stored in buffer awaiting re-use.

EXAMPLE 11

Use of Zn-HypoGel at Low Arsenic Concentrations

Having established the possibility of using Zn-HypoGel in column format at high (ppm range) $As^V$ concentrations, experiments at lower $As^V$ concetrations were also carried out.

A solution of 100 µg/L $As^V$ in 20 mM HEPES (pH 7.5) was prepared. This concentration was chosen as being representative of a wide range of influent waters as well as facilitating comparison with literature. The solution was then passed through the column at a flow rate of 2 ml/min, giving a short contact time of 1.5 minutes.

Figure 13:
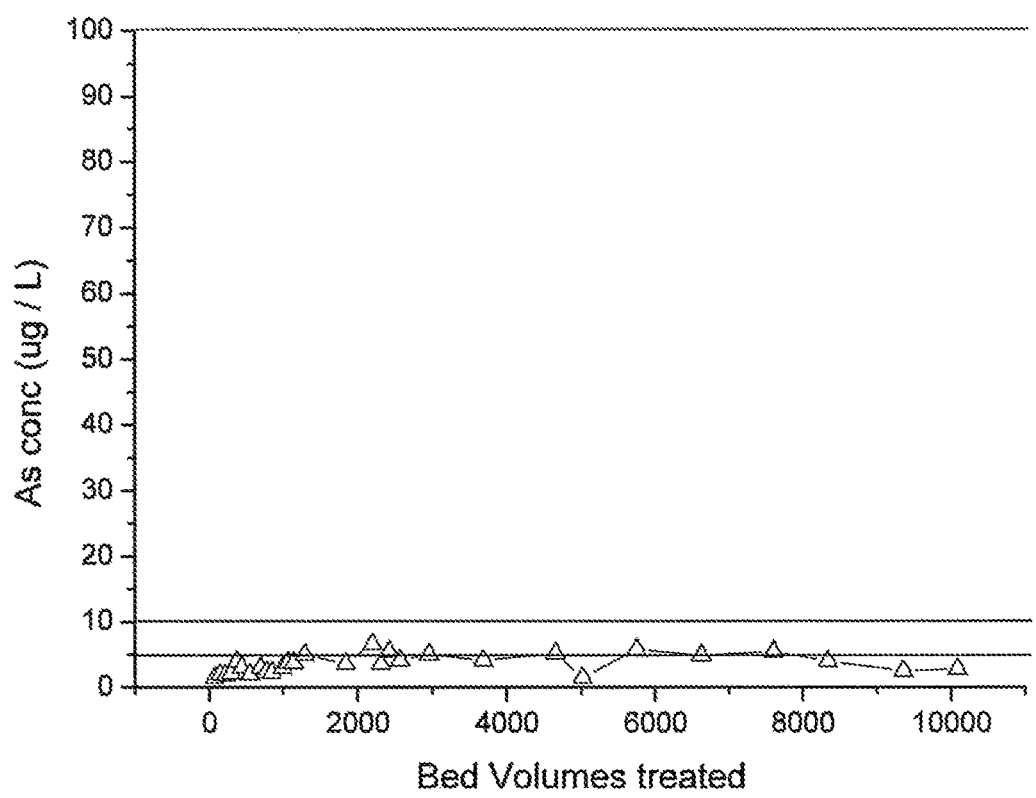
FIG. 13 shows the effluent arsenate concentration obtained from a column of Zn-HypoGel using an influent solution containing 100 μg/L of $As^V$ and 20 mM HEPES at pH 7.5. The green line denotes the influent concentration, the red line the 10 μg/L MCL and the blue line 5 μg/L.

As shown in FIG. 13, the effluent $As^V$ concentration was reduced to below 10 µg/L (red line) and in general below 5 µg/L (blue line). The effluent pH was also measured and remained constant at pH 7.5.

Column breakthrough was not reached even after treatment of 10 000 bed volumes of water (28 L). This is consistent with the $As^V$ capacity determined previously, see Example 9 above. It was shown that 1.5 g of Zn-HypoGel could adsorb 25 mg of $As^V$, therefore if the adsorption was maintained at 95% this column could theoretically treat 95 000 BV of 100 µg/L $As^V$ solution (i.e. 260 L).

EXAMPLE 12

Effect of Influent Water Composition on Zn-HypoGel Fixed-Bed Columns.

A range of studies were then carried out in order to determine the effect of the influent water conditions on the ability of Zn-HypoGel to adsorb $As^V$ in a column. Four different influent waters containing competing anions (Challenge Water—CW) were studied. The chemical composition of the Challenge Water is given in Table 3. The 4 solutions contained a variation of pH and As concentration (either pH 6.5 or 8.5, and 50 µg/L or 300 µg/L).

TABLE 3 the ionic composition of Challenge Water solutions

| Ion | Concentration (mM) | Ratio to 300 µg/L $As^V$ |
|---|---|---|
| $SiO_3^{2-}$ | 0.34 | 85 |
| $HCO_3^-$ | 2.97 | 742.5 |
| $SO_4^{2-}$ | 0.50 | 125 |
| $NO_3^-$ | 0.14 | 35 |
| $F^-$ | 0.05 | 12.5 |
| $H_2PO_4^-/HPO_4^{2-}$ | 0.0013 | 0.325 |
| $Cl^-$ | 1.98 | 495 |
| $Mg^{2+}$ | 0.50 | 125 |
| $Ca^{2+}$ | 0.99 | 247.5 |

The experiments were carried out as follows: the influent was passed through the column at 2 ml/min until 100 bed volumes were treated. 5 samples were collected in this time and analysed for $As^V$. The column was then regenerated with sodium acetate and the next influent treated.

Low Arsenate Concentrations

Figure 14:
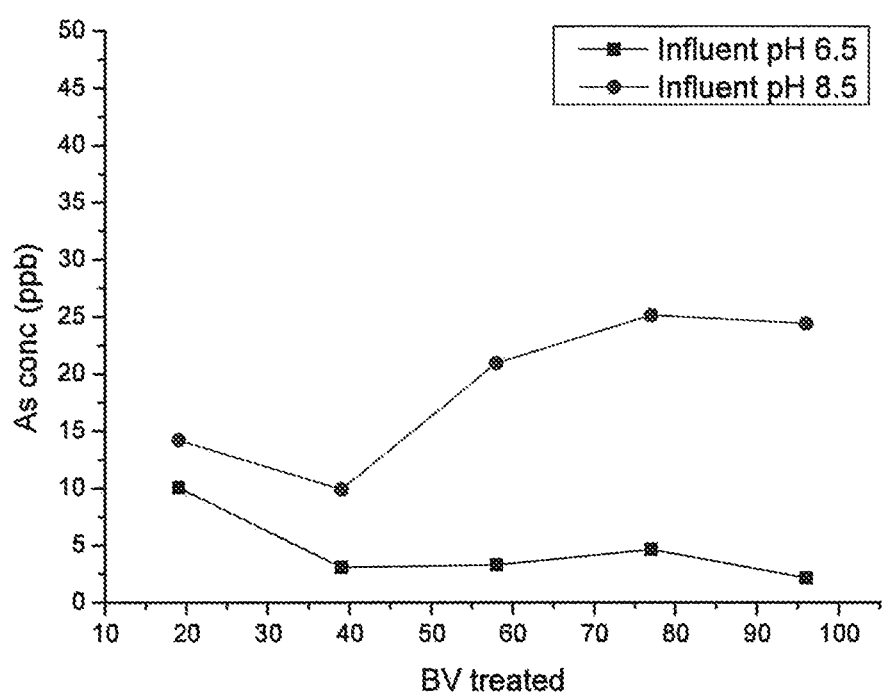
FIG. 14 shows the effluent arsenate concentration after passing Challenge Water through Zn-HypoGel column where the influent $A^V$ concentration is 50 μg/L.

FIG. 14 shows the concentration of $As^V$ remaining after CW containing 50 µg/L at pH 6.5 and 8.5 was passed through the Zn-HypoGel column. The adsorption process was more efficient at the lower pH value. There are two likely explanations for this; firstly, pH 8.5 is greater than the second pKa of phosphate the most competitive anion (here present at 2 equivalents). Therefore phosphate is mostly present as a doubly negative anion and so is a stronger competitor for arsenate at pH 8.5. Secondly, at the more basic pH the presence of competitive hydroxide ions must be considered.

High Arsenate Concentrations

Figure 15:
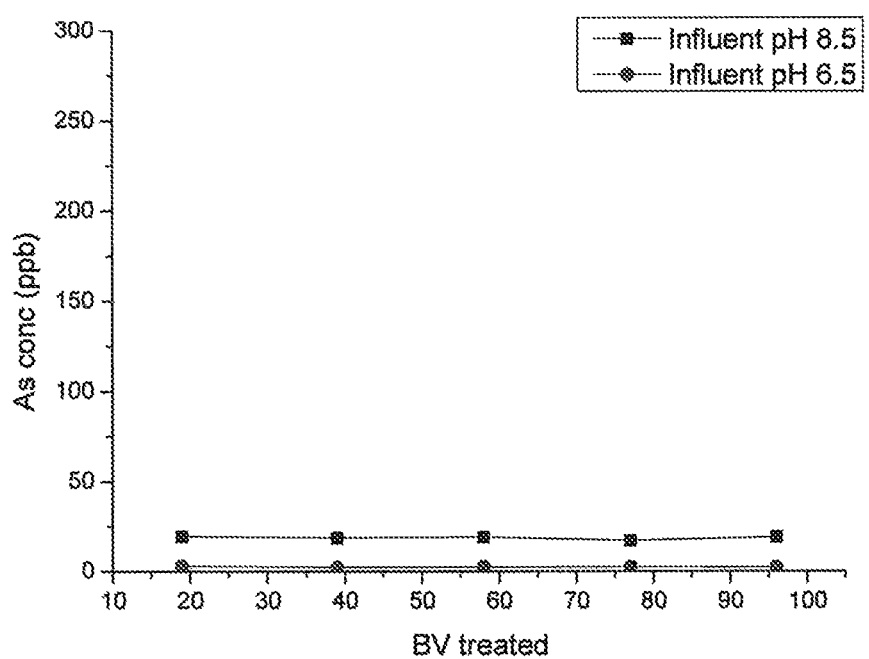
FIG. 15 shows the effluent arsenate concentration after passing Challenge Water through Zn-HypoGel column where the influent $As^V$ concentration is 300 μg/L.

The concentration of $As^V$ remaining after CW containing arsenate at 300 µg/L at either pH 6.5 or 8.5 is shown in FIG. 15. The adsorption was much more efficient at the lower pH value, presumably for the same reasons as outlined above. Here phosphate is present at 0.3 equivalents relative to arsenate. Interestingly the effluent concentration at pH 8.5 of around 20 µg/L is very similar to that observed in FIG. 14 above, even though the influent concentrations of 50 µg/L and 300 µg/L are quite different.

This experiment showed that Zn-HypoGel can remediate high levels of arsenate from CW to well below the current MCL at pH 6.5.

Conclusions

A range of metal complexes were synthesised and fully characterised. The di-zinc complex $L^1$-$Zn_2$ was shown, by two independent methods, to be a good arsenate receptor.

Figure 7:
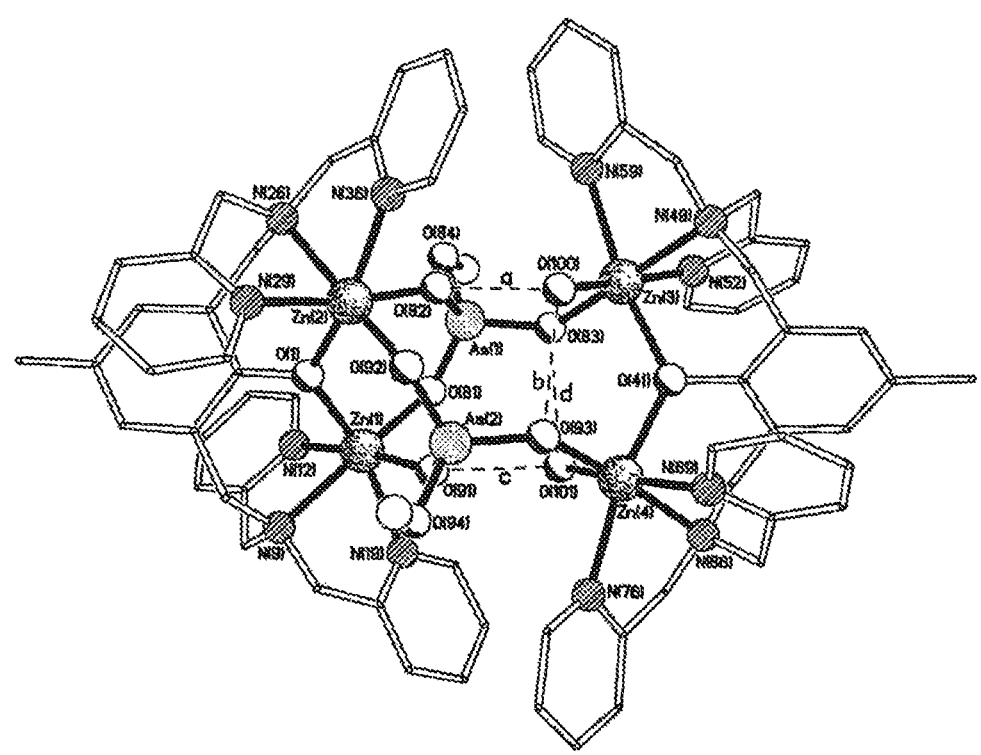
FIG. 7 shows the X-ray crystal structure of $L^1$-$Zn_2$ bound to arsenate.

An X-ray crystal structure (FIG. 7) was obtained which revealed the mode of binding to the metal centre this being the first such structure showing arsenate bound to a metalloreceptor.

It was found that immobilising complex $L^1$-$Zn_2$ on a polystyrene resin resulted in a functional material (Zn-HypoGel) with a high affinity for arsenate. Zn-HypoGel was found to adsorb arsenate efficiently over a wide pH range.

Adsorption from solutions containing high levels of competing ions demonstrates that the material has potential for use in water remediation.

It was surprisingly found that arsenate uptake from competitive solutions was greater than that of Bayoxide™ which is currently used commercially as an arsenic adsorbent.

It was also found that the material could be regenerated and re-used by simply washing with a basic brine solution.

It was surprisingly and unexpectedly found that the regeneration resulted in no loss of performance even after multiple desorption cycles.

Zn-HypoGel has been successfully used as resin in fixed-bed columns to remediate $As^V$-contaminated waters. The columns could remediate highly competitive Challenge Water to very low levels of arsenate when the influent pH was 6.5. However, when the influent pH was 8.5, the effluent $As^V$ concentration remained above 20 µg/L. The presence of phosphate (as $HPO_4^{2-}$) and hydroxide ions in solution could increase the competition for adsorption sites and therefore inhibit $As^V$ uptake at higher pH.

The invention claimed is:

1. A method of reducing the arsenic concentration in an aqueous solution that comprises arsenic, which method comprises contacting the aqueous solution with a complex of Formula I,

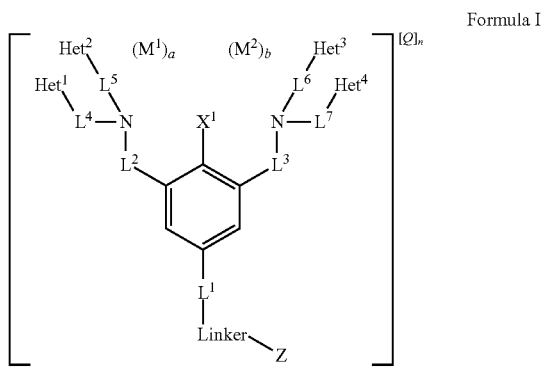

Formula I wherein $M^1$ and $M^2$ are the same or different and are independently selected from V, Mn, Ga, Cu, Ni, Co, Fe or Zn; wherein a is 0, or 1, and b is 0, or 1, provided that a+b together must be at least 1;

Q is a negatively charged counter ion, wherein the negatively charged counter ion is $NO_3^-$, $ClO_4^-$, $AcO^-$, $PF_6^-$, $BF_4^-$, $Cl^-$, $BPh_4^-$ or $Br^-$;

n is from 1 to 5;

$X^1$ is OH, O, SH or S;

$L^1$ is a group selected from $-L^{a1}-C(O)NR-$, $-L^{a2}-C(O)OR-$, $-L^{a3}-NRC(O)-$, $L^{a4}-OC(O)-$, $L^{a5}-O-$ or $L^{a6}-NRO-$, wherein $L^{a1}$, $L^{a2}$, $L^{a3}$, $L^{a4}$, $L^{a5}$ and $L^{a6}$ are each $C_{1-6}$ alkyl, optionally substituted, R is H or $C_{1-6}$ alkyl optionally substituted;

Linker is a polyethylene glycol (PEG) chain with from 1 to 10 repeating units, a $C_{1-16}$ polyamine chain or a $C_{1-16}$ alkyl chain;

Z is a solid support;

$L^2$ to $L^7$ are independently $C_{1-3}$ alkyl, optionally substituted; and $Het^1$ to $Het^4$ are independently 5 to 14 membered heteroaryl group having at least one N atom and optionally substituted.

2. A method according to claim 1, wherein the method reduces the concentration of arsenic in the aqueous solution to less than about 10 µg $L^{-1}$.

3. A method according to claim 2, wherein the method reduces the concentration of arsenic in the aqueous solution to less than about 5 µg $L^{-1}$.

4. A method according to claim 3, wherein the method reduces the concentration of arsenic in the aqueous solution to less than about 1 µg $L^{-1}$.

5. A method according to claim 1, wherein the solid support is a polystyrene based resin.

6. A method according to claim 1, wherein the Linker is a polyethylene glycol (PEG) chain with from 1 to 10 repeating units.

7. A method according to claim 6, wherein the solid support is a polystyrene based resin and the Linker is a polyethylene glycol (PEG) chain with from 1 to 10 repeating units.

8. A method according to claim 1, wherein one of $M^1$ or $M^2$ is zinc or both $M^1$ and $M^2$ are zinc.

9. A method according to claim 1, wherein the initial pH of the aqueous solution prior to a point of contact with the complex of Formula I is from about 1 to about 10.

10. A method according to claim 9, wherein the initial pH of the aqueous solution prior to a point of contact with the complex of Formula I is from about 5 to about 10.

11. A method according to claim 10, wherein the initial pH prior to a point of contact with the complex of Formula I is about 7.

12. A method according to claim 1, comprising the additional step of regenerating the complex of Formula I.

13. A method according to claim 12, wherein the complex of Formula I is regenerated by contacting a complex of Formula I to which arsenic is bound with a solution of an alkali metal salt or an alkali earth metal salt having a pH of from about 7 to about 10.

14. A method according to claim 13, wherein the solution is of a halide salt of an alkali metal.

15. A method according to claim 14, wherein the complex of Formula I is regenerated by contacting the complex of Formula I to which arsenic is bound with a NaCl or NaOAc solution having a pH from about 7 to about 10.

16. A method according to claim 1, further comprising the step of:

contacting the complex of Formula I to which arsenic is bound formed in step (i) with a NaCl or NaOAc solution having a pH of from about 7 to about 10.

17. A method according to claim 1, comprising the additional step of filtering the aqueous solution comprising arsenic before contacting with a complex of Formula I.

18. A method according to claim 1, comprising the additional step of filtering the aqueous solution comprising a complex of Formula I to which arsenic is bound after the aqueous solution has been contacted with a complex of Formula I.

19. A method according to claim 1, comprising the additional step of reacting the aqueous solution comprising arsenic with an oxidising agent before contacting with a complex of Formula I, such that any arsenite present in the aqueous solution is oxidised to arsenate.

20. A method according to claim 1, wherein the complex of formula I is used in combination with an additional absorbent.

21. A method according to claim 20, wherein the additional absorbent is an iron oxide absorbent.

22. A method for providing potable water comprising a method according to claim 1.

23. A complex of Formula IV,

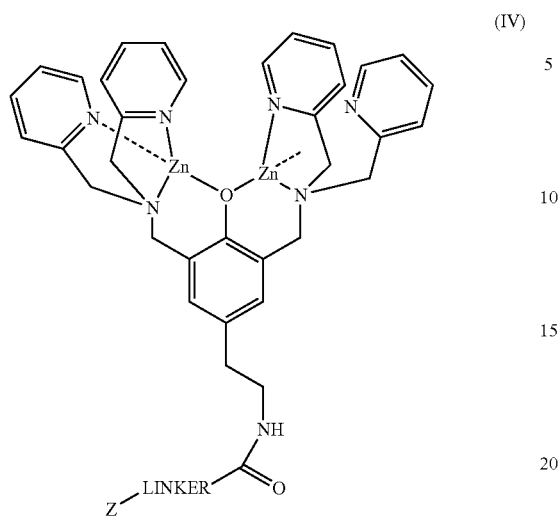

(IV)

wherein Z is a solid support and the linker is a polyethylene glycol (PEG) chain with from 1 to 10 repeating units, a $C_{1-16}$ polyamine chain or a $C_{1-16}$ alkyl chain.

24. A complex according to claim 23, wherein the solid support is a polystyrene based resin.

25. A complex according to claim 24, wherein the solid support is a polystyrene based resin and the Linker is a polyethylene glycol (PEG) chain with from 1 to 10 repeating units.

* * * * *